United States Patent
Gong et al.

(10) Patent No.: US 12,445,242 B2
(45) Date of Patent: Oct. 14, 2025

(54) DATA TRANSMISSION METHOD AND COMMUNICATION APPARATUS

(71) Applicant: HUAWEI TECHNOLOGIES CO., LTD., Guangdong (CN)

(72) Inventors: Bo Gong, Shenzhen (CN); Mengshi Hu, Shenzhen (CN); Chenchen Liu, Shenzhen (CN); Jian Yu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 18/613,252

(22) Filed: Mar. 22, 2024

(65) Prior Publication Data
US 2024/0235757 A1    Jul. 11, 2024

Related U.S. Application Data

(63) Continuation of application No. PCT/CN2022/119665, filed on Sep. 19, 2022.

(30) Foreign Application Priority Data

Sep. 23, 2021   (CN) .......................... 202111116352.X

(51) Int. Cl.
*H04L 5/00* (2006.01)
*H04L 27/26* (2006.01)

(52) U.S. Cl.
CPC .......... *H04L 5/0046* (2013.01); *H04L 5/0017* (2013.01); *H04L 27/2621* (2013.01)

(58) Field of Classification Search
CPC . H04L 5/0046; H04L 5/0017; H04L 27/2621; H04L 5/0055; H04L 5/0057;
(Continued)

(56) References Cited

U.S. PATENT DOCUMENTS

2021/0399864 A1* 12/2021 Lim ...................... H04L 1/0025
2023/0198825 A1*  6/2023 Park ....................... H04W 12/06
                                                              370/336
(Continued)

FOREIGN PATENT DOCUMENTS

| CN | 114339893 A | 4/2022 |
|---|---|---|
| WO | 2021045422 A1 | 3/2021 |
| WO | 2021184024 A1 | 9/2021 |

OTHER PUBLICATIONS

Sigurd Schelstraete, "Minutes 802.11 be PHY ad hoc Telephone Conferences, May-Jul. 2020", IEEE 802.11-20/0787r3, May 19, 2020, total 26 pages,XP068169513.
(Continued)

*Primary Examiner* — Khanh C Tran

(57) ABSTRACT

A data transmission method and a communication apparatus are disclosed. The method includes: determining an aggregated physical layer protocol data unit (A-PPDU), where the A-PPDU includes at least two PPDUs belonging to different protocols, the A-PPDU includes a first sequence, the first sequence includes N segments of subsequences, any of the N segments of subsequences is obtained by performing phase rotation on a high efficiency-long training field (HE LTF) sequence and/or an extreme high throughput-long training field (EHT LTF) sequence based on a phase rotation parameter corresponding to the HE LTF sequence and/or a phase rotation parameter corresponding to the EHT LTF sequence, N phase rotation parameters corresponding to the N segments of subsequences include at least one phase rotation parameter whose value is −1, and N is a positive integer greater than or equal to 2; and sending the A-PPDU.

20 Claims, 4 Drawing Sheets

(58) Field of Classification Search
CPC ............ H04L 27/2618; H04L 27/2615; H04L 27/262; H04L 5/0053; H04L 5/0048
See application file for complete search history.

(56) References Cited

U.S. PATENT DOCUMENTS

| | | | |
|---|---|---|---|
| 2024/0023017 A1* | 1/2024 | Park | H04W 52/0216 |
| 2024/0039773 A1* | 2/2024 | Lim | H04L 27/2602 |
| 2024/0040549 A1* | 2/2024 | Lim | H04L 5/0007 |

OTHER PUBLICATIONS

Extended European Search Report issued in EP22871923.3, dated Dec. 2, 2024, 11 pages.
Rui Cao, Aggregated PPDU for Large BW, doc.:IEEE. 802.11-20/0693r102.5B, 2020(May 2, 2020), Slide 1-7.
IEEE Std 802.11a-1999, Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: High-speed Physical Layer in the 5 GHZ Band, Sep. 16, 1999, total 90 pages.
IEEE Std 802.11n-2009, IEEE Standard for Information technology Telecommunications and information exchange between systemsLocal and metropolitan area networks Specific requirementsPart 11: Wireless LAN Medium Access Control (MAC) and Physical Layer (PHY) SpecificationsAmendment 5: Enhancements for Higher Throughput, Oct. 29, 2009, total 536 pages.
IEEE P802.11ax D8.0, Draft Standard for Information technology-Telecommunications and information exchange between systems Local and metropolitan area networks Specific requirements Part 11: Wireless LAN Medium Access Control (MAC) and Physical Layer (PHY) Specifications Amendment 1: Enhancements for High Efficiency WLAN, Oct. 2020, total 820 pages.
IEEE Std 802.11g 2003, IEEE Standard for Information technology Telecommunications and information exchange between systems Local and metropolitan area networks Specific requirements Part 11: Wireless LAN Medium Access Control (MAC) and Physical Layer (PHY) specifications Amendment 4: Further Higher Data Rate Extension in the 2.4 GHz Band, Jun. 12, 2003, total 77 pages.
IEEE P802.11be /D1.1 Draft Standard for Information technology-Telecommunications and information exchange between systems Local and metropolitan area networks-Specific requirements Part 11: Wireless LAN Medium Access Control (MAC) and Physical Layer (PHY) Specifications Amendment 8: Enhancements for extremely high throughput (EHT), LAN/MAN Standards Committee of the IEEE Computer Society, Jul. 2021, total 685 pages.
Office Action issued in TW 11121046250, dated Oct. 25, 2024, 9 pages.
International Search Report and Written Opinion issued in PCT/CN2022/119665, dated Nov. 29, 2022, 12 pages.

* cited by examiner

| $1*LTF_k$ 0 ns | $-1*LTF_k$ 0 ns | $1*LTF_k$ 0 ns | $1*LTF_k$ 0 ns |
|---|---|---|---|
| $1*LTF_k$ −400 ns | $1*LTF_k$ −400 ns | $-1*LTF_k$ −400 ns | $1*LTF_k$ −400 ns |
| $1*LTF_k$ −200 ns | $1*LTF_k$ −200 ns | $1*LTF_k$ −200 ns | $-1*LTF_k$ −200 ns |
| $-1*LTF_k$ −600 ns | $1*LTF_k$ −600 ns | $1*LTF_k$ −600 ns | $1*LTF_k$ −600 ns |
FIG. 2
Type 1 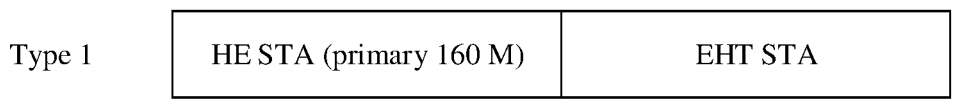
Type 2 
Type 3 
Type 4 
FIG. 3

EHT STAs (160 M)          HE STAs (160 M)

DATA TRANSMISSION METHOD AND COMMUNICATION APPARATUS

CROSS-REFERENCE TO RELATED APPLICATIONS

This application is a continuation of International Application No. PCT/CN2022/119665, filed on Sep. 19, 2022, which claims priority to Chinese Patent Application No. 202111116352.X, filed on Sep. 23, 2021. The disclosures of the aforementioned applications are hereby incorporated by reference in their entireties.

TECHNICAL FIELD

Embodiments of this application relate to the field of communication technologies, and more specifically, to a data transmission method and a communication apparatus.

BACKGROUND

Since the 802.11a/g standard, a wireless local area network (WLAN) has sequentially experienced the evolution of standards such as the 802.11n standard, the 802.11ac standard, the 802.11ax standard, and the 802.11be standard.

Different WLAN standards support different specifications. For example, a maximum bandwidth resource supported by the 802.11ax standard is 160 MHz, and a maximum bandwidth resource supported by the 802.11be standard is 320 MHz. For a non-access point (non-AP) station (STA) in the 802.11ax standard, the 160 MHz bandwidth resource is optional. For a non-AP STA in the 802.11be standard, the 160 MHz and 320 MHz bandwidth resources are also optional. This means that in an extreme high throughput (EHT)-AP scenario, a high-efficiency (HE) non-AP STA and an EHT non-AP STA still continue to operate on a bandwidth of 80 MHz or 160 MHz.

To improve a throughput of a large-bandwidth basic service set (BSS), an EHT AP supporting a large bandwidth may simultaneously send a corresponding physical layer protocol data unit (PPDU) to a plurality of non-AP STAs, that is, the EHT AP may send an aggregated PPDU (A-PPDU) to the HE non-AP STA and the EHT non-AP STA.

However, in a downlink transmission process of the A-PPDU, if a long training field (LTF) sequence included in the A-PPDU is simply directly sent, a large peak to average power ratio (PAPR) is generated.

SUMMARY

Embodiments of this application provide a data transmission method and a communication apparatus, to adjust an LTF sequence sending manner used in downlink transmission of an A-PPDU, so that a total PAPR generated in downlink transmission of the A-PPDU can be effectively reduced in this application.

According to a first aspect, a data transmission method is provided, including: determining an aggregated physical layer protocol data unit (A-PPDU), where the A-PPDU includes at least two PPDUs belonging to different protocols, the A-PPDU includes a first sequence, the first sequence includes N segments of subsequences, any of the N segments of subsequences is obtained by performing phase rotation on a high efficiency-long training field (HE LTF) sequence and/or an extreme high throughput-long training field (EHT LTF) sequence based on a phase rotation parameter corresponding to the HE LTF sequence and/or a phase rotation parameter corresponding to the EHT LTF sequence, N phase rotation parameters corresponding to the N segments of subsequences include at least one phase rotation parameter whose value is −1, and N is a positive integer greater than or equal to 2; and sending the A-PPDU.

It should be understood that, phase rotation is performed on each segment of subsequence of the first sequence included in the A-PPDU, and the corresponding N phase rotation parameters include at least one phase rotation parameter whose value is −1, so that a manner of superposition between tones corresponding to the subsequences can be changed. In this way, a total PAPR generated in downlink transmission of the A-PPDU can be effectively reduced in this application.

With reference to the first aspect, in some implementations of the first aspect, the A-PPDU includes a HE PPDU and an EHT PPDU.

Phase rotation is performed on each segment of subsequence of the first sequence included in the A-PPDU including the HE PPDU and the EHT PPDU, and the corresponding N phase rotation parameters include at least one phase rotation parameter whose value is −1. In this way, a total PAPR generated in downlink transmission of the A-PPDU including the HE PPDU and the EHT PPDU can be effectively reduced in this application.

With reference to the first aspect, in some implementations of the first aspect, the sending the A-PPDU includes: sending the A-PPDU on a 320 MHz bandwidth resource.

In an implementation, when a bandwidth resource is 320 MHz, HE LTF sequences corresponding to some subsequences of the first sequence may be located on a lower 160 MHz bandwidth resource of the 320 MHz bandwidth resource, and EHT LTF sequences corresponding to the other subsequences of the first sequence may be located on a higher 160 MHz bandwidth resource of the 320 MHz bandwidth resource; or HE LTF sequences corresponding to some subsequences of the first sequence may be located on a higher 160 MHz bandwidth resource of the 320 MHz bandwidth resource, and EHT LTF sequences corresponding to the other subsequences of the first sequence may be located on a lower 160 MHz bandwidth resource of the 320 MHz bandwidth resource.

With reference to the first aspect, in some implementations of the first aspect, N=4, and the N phase rotation parameters include at least one of the following groups: {1, −1, −1, −1}, {1, −1, 1, 1}, {1, 1, −1, 1}, {1, 1, 1, −1}, {−1, 1, 1, 1}, {−1, 1, −1, −1}, {−1, −1, 1, −1}, {−1, −1, −1, 1}, {1, −1, −1, 1}, {1, −1, 1, −1}, {−1, 1, 1, −1}, {−1, 1, −1, 1}, {1, 1, −1, −1}, and {−1, −1, 1, 1}.

Through the foregoing several combination manners, a manner of superposition between tones corresponding to the subsequences may be changed. In this way, a total PAPR generated in downlink transmission of the A-PPDU can be effectively reduced in this application.

With reference to the first aspect, in some implementations of the first aspect, the method further includes: determining a second data sequence, where the second data sequence is determined based on a difference sequence and a first data sequence; and sending the second data sequence, where the first data sequence is an original data sequence, the second data sequence is a to-be-sent data sequence, and the difference sequence is determined based on the first sequence.

It should be understood that, that the first data sequence is an original data sequence may be understood that the first data sequence is a data sequence generated by a network device based on a physical layer service data unit (PSDU) transmitted by a media access layer (MAC).

It should be understood that the difference sequence may be considered as follows: For example, if a sequence A is considered as an actually sent LTF sequence, and a sequence B is considered as an LTF sequence that needs to be sent, a difference sequence between the sequence A and the sequence B is Gapseq=A./B, where "./" means that an element in the sequence A is correspondingly divided by an element in the sequence B, and it is specified that a quotient obtained by dividing an element 0 in the sequence A by an element 0 in the sequence B is 1.

It should be understood that, that the difference sequence is determined based on the first sequence may be understood as follows: The first sequence that the network device determines to send to a terminal device is not necessarily the same as an LTF sequence determined by the terminal device.

For example, when the first sequence is {HE LTF 160_P1*1, HE LTF 160_P2*-1, EHT LTF 160_P1*-1, EHT LTF 160_P2*-1}, and the LTF sequence determined by the terminal device is {HE LTF 160, EHT LTF 160}, the difference sequence=[HE LTF 160_P1*1./HE LTF 160_P1, HE LTF 160_P2*-1./HE LTF 160_P2, EHT LTF 160_P1*-1./EHT LTF 160_P1, EHT LTF 160_P2*-1./EHT LTF 160_P2]. It should be understood that, the HE LTF 160_P1 means that when a bandwidth resource is 160 MHz, the sequence is a first part of a HE LTF sequence sent on the 160 MHz bandwidth resource, and the first part of the sequence occupies a lower 80 MHz bandwidth resource of the 160 MHz bandwidth resource. For the HE LTF 160_P2 and the like, refer to the description of the HE LTF 160_P1, and for detailed content of the HE LTF 160_P2 and the like, refer to the following specific description.

Specifically, the LTF sequence determined by the terminal device is {HE LTF 160, EHT LTF 160}, and the first sequence is {HE LTF 160_P1*1, HE LTF 160_P2*-1, EHT LTF 160_P1*-1, EHT LTF 160_P2*-1}. In this case, for the sequence {HE LTF 160} determined by the terminal device, the LTF sequence actually sent by the network device is {HE LTF 160_P1*1, HE LTF 160_P2*-1}, and the network device needs to determine a difference sequence between the two sequences; and for the sequence {EHT LTF 160} determined by the terminal device, the LTF sequence actually sent by the network device is {EHT LTF 160_P1*-1, EHT LTF 160_P2*-1}, and the network device also needs to determine a difference sequence between the two sequences. For the sequence {EHT LTF 160} and the sequence {EHT LTF 160_P1*-1, EHT LTF 160_P2*-1}, and the sequence {HE LTF 160} and the sequence {HE LTF 160_P1*1, HE LTF 160_P2*-1}, a difference sequence between the two sequences may be considered to include two values: phase rotation parameters −1 and 1. For example, if the sequence {HE LTF 160} includes 10 numbers, the sequence {HE LTF 160_P1*1, HE LTF 160_P2*-1} also includes 10 numbers, the sequence {HE LTF 160_P1*1} includes five numbers, and the sequence {HE LTF 160_P2*-1} includes five numbers, the corresponding difference sequence is {1, 1, 1, 1, 1, −1, −1, −1, −1, −1}. If the sequence {EHT LTF 160} includes 10 numbers, the sequence {EHT LTF 160_P1*-1, EHT LTF 160_P2*-1} also includes 10 numbers, the sequence {EHT LTF 160_P1*-1} includes five numbers, and the sequence {EHT LTF 160_P2*-1} includes five numbers, the corresponding difference sequence is {−1, −1, −1, −1, −1, −1, −1, −1, −1, −1}. Therefore, a difference sequence between the sequence {HE LTF 160, EHT LTF 160} and the first sequence {HE LTF 160_P1*1, HE LTF 160_P2*-1, EHT LTF 160_P1*-1, EHT LTF 160_P2*-1} is {1, 1, 1, 1, 1, −1, −1, −1, −1, −1, −1, −1, −1, −1, −1, −1, −1, −1, −1, −1}.

Therefore, the second data sequence and the first data sequence meet the following relationship: second data sequence=first data sequence.*Gapseq. In other words, each element in the first data sequence needs to be multiplied by each corresponding element in Gapseq in a one-to-one manner, to obtain the second data sequence.

Specifically, after determining the difference sequence, the network device multiplies corresponding elements in the first data sequence based on elements in the difference sequence, to determine the second data sequence.

It should be understood that, after the network device adjusts an LTF sequence sending manner, the network device also needs to perform corresponding processing on transmission of a data sequence. In this way, a problem that a sent sequence is inconsistent with a known sequence of the terminal device can be resolved, so that transparent transmission is implemented for the terminal device, and the terminal device does not need to make any modification or change.

According to a second aspect, a data transmission method is provided, including: determining an aggregated physical layer protocol data unit (A-PPDU), where the A-PPDU includes at least two PPDUs belonging to different protocols, the A-PPDU includes a first sequence, and the first sequence includes a high efficiency-long training field (HE LTF) sequence or an extreme high throughput-long training field (EHT LTF) sequence; and sending the A-PPDU.

Composition of an LTF sequence for downlink transmission of the A-PPDU is changed, in other words, only a HE LTF sequence or an EHT LTF sequence is sent, so that a total PAPR of the A-PPDU can be effectively reduced in this application.

With reference to the second aspect, in some implementations of the second aspect, the A-PPDU includes a HE PPDU and an EHT PPDU.

Specific composition of the first sequence included in the A-PPDU including the HE PPDU and the EHT PPDU is changed, so that a total PAPR generated in downlink transmission of the A-PPDU including the HE PPDU and the EHT PPDU can be effectively reduced in this application.

With reference to the second aspect, in some implementations of the second aspect, the sending the A-PPDU includes: sending the A-PPDU on a 320 MHz bandwidth resource.

In an implementation, when the bandwidth resource is 320 MHz, the first sequence is an EHT LTF sequence sent on the 320 MHz bandwidth resource.

With reference to the second aspect, in some implementations of the second aspect, the sending the A-PPDU includes: sending the A-PPDU on a 160 MHz bandwidth resource.

In an implementation, when a bandwidth resource is 160 MHz, the first sequence is an EHT LTF sequence or a HE LTF sequence.

Optionally, when the first sequence is an EHT LTF sequence, an EHT LTF sequence actually sent by a network device may be a half of an EHT LTF sequence corresponding to a 320 MHz bandwidth resource. For example, the first sequence is {EHT LTF 320_P1, EHT LTF 320_P2}, or the first sequence is {EHT LTF 320_P3, EHT LTF 320_P4}.

With reference to the second aspect, in some implementations of the second aspect, the method further includes: determining a second data sequence based on a difference sequence and a first data sequence, where the difference sequence is determined based on the first sequence; and sending the second data sequence, where the first data sequence is an original data sequence, and the second data sequence is a to-be-sent data sequence.

It should be understood that, that the difference sequence is determined based on the first sequence may be understood as follows: After the network device determines the first sequence sent to a terminal device, an LTF sequence determined by the terminal device is different from the first sequence. For example, if the terminal device determines that the LTF sequence sent by the network device is {HE LTF 80, EHT LTF 80}, there is a difference sequence between the two sequences.

For example, the first sequence is {EHT LTF 320_P1, EHT LTF 320_P2}. When the sequence determined by the terminal device is {HE LTF 80, EHT LTF 80}, the difference sequence=[EHT LTF 320_P1./HE LTF 80, EHT LTF 320_P2./EHT LTF 80].

Specifically, the first sequence includes the HE LTF sequence or the EHT LTF sequence, and the first sequence is sent by the network device to the terminal device. However, the terminal device determines a second sequence. To be specific, the second sequence may be considered as a protocol-defined LTF sequence, and there is a difference sequence between the first sequence and the second sequence. The difference sequence includes quotients obtained by dividing elements in the first sequence by corresponding elements in the second sequence.

After determining the difference sequence between the first sequence and the second sequence, the network device multiplies each element in the first data sequence by a corresponding element in the difference sequence, to determine the second data sequence. In other words, after the network device adjusts an LTF sequence sending manner, the network device performs the foregoing processing on transmission of a data sequence. In this way, a problem that a sent sequence is inconsistent with a known sequence of the terminal device is resolved, so that transparent transmission is implemented for the terminal device, and the terminal device does not need to make any modification or change.

According to a third aspect, a data transmission method is provided, including: receiving an aggregated physical layer protocol data unit (A-PPDU), where the A-PPDU includes at least two PPDUs belonging to different protocols, the A-PPDU includes a first sequence, the first sequence includes N segments of subsequences, any of the N segments of subsequences is obtained by performing phase rotation on a high efficiency-long training field HE LTF sequence and/or an extreme high throughput-long training field (EHT LTF) sequence based on a phase rotation parameter corresponding to the HE LTF sequence and/or a phase rotation parameter corresponding to the EHT LTF sequence, N phase rotation parameters corresponding to the N segments of subsequences include at least one phase rotation parameter whose value is −1, and N is a positive integer greater than or equal to 2.

With reference to the third aspect, in some implementations of the third aspect, the A-PPDU includes a HE PPDU and an EHT PPDU.

With reference to the third aspect, in some implementations of the third aspect, the receiving an A-PPDU includes: receiving the A-PPDU on a 320 MHz bandwidth resource.

With reference to the third aspect, in some implementations of the third aspect, N=4, and the N phase rotation parameters include at least one of the following groups:
{1, −1, −1, −1}, {1, −1, 1, 1}, {1, 1, −1, 1}, {1, 1, 1, −1}, {−1, 1, 1, 1}, {−1, 1, −1, −1}, {−1, −1, 1, −1}, {−1, −1, −1, 1}, {1, −1, −1, 1}, {1, −1, 1, −1}, {−1, 1, 1, −1}, {−1, 1, −1, 1}, {1, 1, −1, −1}, and {−1, −1, 1, 1}.

With reference to the third aspect, in some implementations of the third aspect, the method further includes: receiving a second data sequence, where the second data sequence is determined based on a difference sequence and a first data sequence, the first data sequence is an original data sequence, the second data sequence is a to-be-sent data sequence, and the difference sequence is determined based on the first sequence.

According to a fourth aspect, a data transmission method is provided, including: receiving an aggregated physical layer protocol data unit (A-PPDU), where the A-PPDU includes at least two PPDUs belonging to different protocols, the A-PPDU includes a first sequence, and the first sequence includes a high efficiency-long training field (HE LTF) sequence or an extreme high throughput-long training field (EHT LTF) sequence.

With reference to the fourth aspect, in some implementations of the fourth aspect, the A-PPDU includes a HE PPDU and an EHT PPDU.

With reference to the fourth aspect, in some implementations of the fourth aspect, the receiving an A-PPDU includes: receiving the A-PPDU on a 320 MHz bandwidth resource.

With reference to the fourth aspect, in some implementations of the fourth aspect, the receiving an A-PPDU includes: receiving the A-PPDU on a 160 MHz bandwidth resource.

With reference to the fourth aspect, in some implementations of the fourth aspect, the method further includes: receiving a second data sequence, where the second data sequence is determined based on a difference sequence and a first data sequence, the difference sequence is determined based on the first sequence, the first data sequence is an original data sequence, and the second data sequence is a to-be-sent data sequence.

According to a fifth aspect, a communication apparatus is provided, including: a processing unit, configured to determine an aggregated physical layer protocol data unit (A-PPDU), where the A-PPDU includes at least two PPDUs belonging to different protocols, the A-PPDU includes a first sequence, the first sequence includes N segments of subsequences, any of the N segments of subsequences is obtained by performing phase rotation on a high efficiency-long training field (HE LTF) sequence and/or an extreme high throughput-long training field (EHT LTF) sequence based on a phase rotation parameter corresponding to the HE LTF sequence and/or a phase rotation parameter corresponding to the EHT LTF sequence, N phase rotation parameters corresponding to the N segments of subsequences include at least one phase rotation parameter whose value is −1, and N is a positive integer greater than or equal to 2; and a transceiver unit, configured to send the A-PPDU.

With reference to the fifth aspect, in some implementations of the fifth aspect, the A-PPDU includes a HE PPDU and an EHT PPDU.

With reference to the fifth aspect, in some implementations of the fifth aspect, the transceiver unit is configured to send the A-PPDU on a 320 MHz bandwidth resource.

With reference to the fifth aspect, in some implementations of the fifth aspect, N=4, and the N phase rotation parameters include at least one of the following groups:
{1, −1, −1, −1}, {1, −1, 1, 1}, {1, 1, −1, 1}, {1, 1, 1, −1}, {−1, 1, 1, 1}, {−1, 1, −1, −1}, {−1, −1, 1, −1}, {−1, −1, −1, 1}, {1, −1, −1, 1}, {1, −1, 1, −1}, {−1, 1, 1, −1}, {−1, 1, −1, 1}, {1, 1, −1, −1}, and {−1, −1, 1, 1}.

With reference to the fifth aspect, in some implementations of the fifth aspect, the processing unit is further configured to determine a second data sequence, where the second data sequence is determined based on a difference sequence and a first data sequence; and the transceiver unit is further configured to send the second data sequence, where the first data sequence is an original data sequence, the second data sequence is a to-be-sent data sequence, and the difference sequence is determined based on the first sequence.

According to a sixth aspect, a communication apparatus is provided, including: a processing unit, configured to determine an aggregated physical layer protocol data unit (A-PPDU), where the A-PPDU includes at least two PPDUs belonging to different protocols, the A-PPDU includes a first sequence, and the first sequence includes a high efficiency-long training field (HE LTF) sequence or an extreme high throughput-long training field (EHT LTF) sequence; and a transceiver unit, configured to send the A-PPDU.

With reference to the sixth aspect, in some implementations of the sixth aspect, the A-PPDU includes a HE PPDU and an EHT PPDU.

With reference to the sixth aspect, in some implementations of the sixth aspect, the transceiver unit is configured to send the A-PPDU on a 320 MHz bandwidth resource.

With reference to the sixth aspect, in some implementations of the sixth aspect, the transceiver unit is configured to send the A-PPDU on a 160 MHz bandwidth resource.

With reference to the sixth aspect, in some implementations of the sixth aspect, the processing unit is further configured to determine a second data sequence based on a difference sequence and a first data sequence, where the difference sequence is determined based on the first sequence; and the transceiver unit is further configured to send the second data sequence, where the first data sequence is an original data sequence, and the second data sequence is a to-be-sent data sequence.

According to a seventh aspect, a communication apparatus is provided, including: a transceiver unit, configured to receive an aggregated physical layer protocol data unit (A-PPDU), where the A-PPDU includes at least two PPDUs belonging to different protocols, the A-PPDU includes a first sequence, the first sequence includes N segments of subsequences, any of the N segments of subsequences is obtained by performing phase rotation on a high efficiency-long training field (HE LTF) sequence and/or an extreme high throughput-long training field (EHT LTF) sequence based on a phase rotation parameter corresponding to the HE LTF sequence and/or a phase rotation parameter corresponding to the EHT LTF sequence, a product of N phase rotation parameters corresponding to the N segments of subsequences is a negative number, and N is a positive integer greater than or equal to 2.

With reference to the seventh aspect, in some implementations of the seventh aspect, the A-PPDU includes a HE PPDU and an EHT PPDU.

With reference to the seventh aspect, in some implementations of the seventh aspect, the transceiver unit is configured to receive the A-PPDU on a 320 MHz bandwidth resource.

With reference to the seventh aspect, in some implementations of the seventh aspect, N=4, and the N phase rotation parameters include at least one of the following groups:
$\{1, -1, -1, -1\}, \{1, -1, 1, 1\}, \{1, 1, -1, 1\}, \{1, 1, 1, -1\},$
$\{-1, 1, 1, 1\}, \{-1, 1, -1, -1\}, \{-1, -1, 1, -1\}, \{-1, -1, -1, 1\}, \{1, -1, -1, 1\}, \{1, -1, 1, -1\}, \{-1, 1, 1, -1\},$
$\{-1, 1, -1, 1\}, \{1, 1, -1, -1\},$ and $\{-1, -1, 1, 1\}.$ With reference to the seventh aspect, in some implementations of the seventh aspect, the transceiver unit is configured to receive a second data sequence, where the second data sequence is determined based on a difference sequence and a first data sequence, the first data sequence is an original data sequence, the second data sequence is a to-be-sent data sequence, and the difference sequence is determined based on the first sequence.

According to an eighth aspect, a communication apparatus is provided, including: a transceiver unit, configured to receive an aggregated physical layer protocol data unit (A-PPDU), where the A-PPDU includes at least two PPDUs belonging to different protocols, the A-PPDU includes a first sequence, and the first sequence includes a high efficiency-long training field (HE LTF) sequence or an extreme high throughput-long training field (EHT LTF) sequence.

With reference to the eighth aspect, in some implementations of the eighth aspect, the A-PPDU includes a HE PPDU and an EHT PPDU.

With reference to the eighth aspect, in some implementations of the eighth aspect, the transceiver unit is configured to receive the A-PPDU on a 320 MHz bandwidth resource.

With reference to the eighth aspect, in some implementations of the eighth aspect, the transceiver unit is configured to receive the A-PPDU on a 160 MHz bandwidth resource.

With reference to the eighth aspect, in some implementations of the eighth aspect, the transceiver unit is configured to receive a second data sequence, where the second data sequence is determined based on a difference sequence and a first data sequence, the difference sequence is determined based on the first sequence, the first data sequence is an original data sequence, and the second data sequence is a to-be-sent data sequence.

According to a ninth aspect, a communication apparatus is provided, including a processor. The processor is coupled to a memory, the memory is configured to store a computer program or instructions, and the processor is configured to execute the computer program or the instructions in the memory, so that the method according to any one of the first aspect and the possible implementations of the first aspect is performed, or the method according to any one of the second aspect and the possible implementations of the second aspect is performed, or the method according to any one of the third aspect and the possible implementations of the third aspect is performed, or the method according to any one of the fourth aspect and the possible implementations of the fourth aspect is performed.

In a possible implementation, the communication apparatus further includes a transceiver. The transceiver is configured to perform the method according to any one of the first aspect and the possible implementations of the first aspect, or perform the method according to any one of the second aspect and the possible implementations of the second aspect, or perform the method according to any one of the third aspect and the possible implementations of the third aspect, or perform the method according to any one of the fourth aspect and the possible implementations of the fourth aspect.

According to a tenth aspect, a chip system is provided. The chip system includes a logic circuit and a communication interface. The communication interface is configured to receive or send an A-PPDU. The logic circuit is configured to perform the method according to any one of the first aspect and the possible implementations of the first aspect, or perform the method according to any one of the second aspect and the possible implementations of the second aspect, or perform the method according to any one of the third aspect and the possible implementations of the third aspect, or perform the method according to any one of the fourth aspect and the possible implementations of the fourth aspect.

According to an eleventh aspect, a communication system is provided. The communication system includes a communication apparatus on an access point side and a communication apparatus on a station side. The communication apparatus on the access point side is configured to perform the method according to any one of the first aspect and the possible implementations of the first aspect, or the communication apparatus on the access point side is configured to perform the method according to any one of the second aspect and the possible implementations of the second aspect. The communication apparatus on the station side is configured to perform the method according to any one of the third aspect and the possible implementations of the third aspect, or the communication apparatus on the station side is configured to perform the method according to any one of the fourth aspect and the possible implementations of the fourth aspect.

According to a twelfth aspect, a computer-readable storage medium is provided, which stores a computer program or instructions. The computer program or the instructions are used to implement the method according to any one of the first aspect and the possible implementations of the first aspect, or are used to implement the method according to any one of the second aspect and the possible implementations of the second aspect, or are used to implement the method according to any one of the third aspect and the possible implementations of the third aspect, or are used to implement the method according to any one of the fourth aspect and the possible implementations of the fourth aspect.

According to a thirteenth aspect, a computer program product is provided. When the computer program product is run on a computer, the computer is enabled to perform the method according to any one of the first aspect and the possible implementations of the first aspect, or perform the method according to any one of the second aspect and the possible implementations of the second aspect, or perform the method according to any one of the third aspect and the possible implementations of the third aspect, or perform the method according to any one of the fourth aspect and the possible implementations of the fourth aspect.

BRIEF DESCRIPTION OF DRAWINGS

FIG. 2 is a schematic diagram of example construction of an LTF;

FIG. 3 is a schematic diagram of an example A-PPDU aggregation type;

DESCRIPTION OF EMBODIMENTS

The following describes the technical solutions in this application with reference to the accompanying drawings.

The technical solutions in embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, and a future communication system.

A terminal device in embodiments of this application may be user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a public land mobile network (PLMN), or the like. This is not limited in embodiments of this application.

A network device in embodiments of this application may be a device configured to communicate with the terminal device. The network device may be a base transceiver station (base transceiver station, BTS) in a GSM system or CDMA, a NodeB (NodeB, NB) in a WCDMA system, an evolved NodeB (eNB or eNodeB) in an LTE system, or a radio controller in a cloud radio access network (CRAN) scenario. Alternatively, the network device may be a relay station, an access point, a vehicle-mounted device, a wearable device, a network device in a 5G network, a network device in a PLMN, or the like. This is not limited in embodiments of this application.

Figure 1:
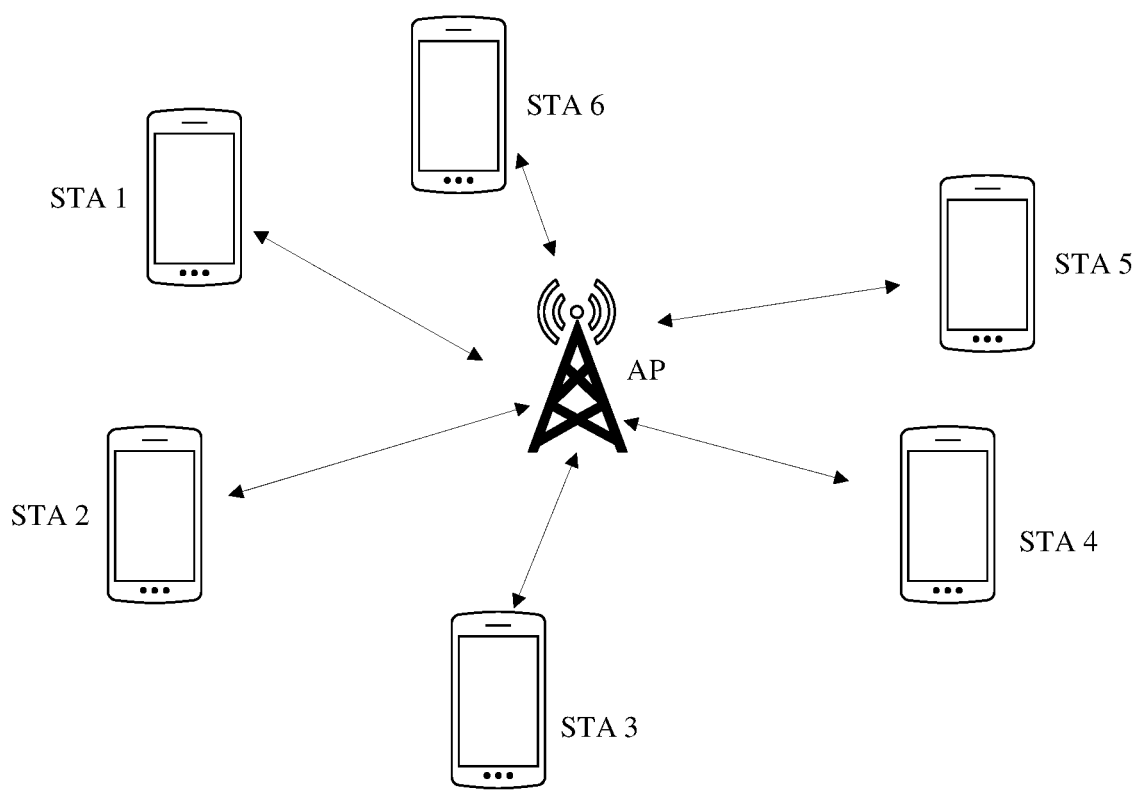
FIG. 1 is a schematic diagram of an example application scenario according to an embodiment of this application.

FIG. 1 is a schematic diagram of an application scenario according to an embodiment of this application. In FIG. 1, an AP may be a communication server, a router, or a switch; or may be any one of the foregoing network devices. A STA may be a mobile phone, a computer; or may be any one of the foregoing terminal devices. This is not limited in this embodiment of this application. For ease of description, in this specification, a station of an access point type is referred to as an access point (access point, AP), and a station of a non-access point type is referred to as a station (STA).

The access point may be an access point through which a terminal device (for example, a mobile phone) accesses a wired (or wireless) network and is mainly deployed in a home, a building, and a campus, and a typical coverage radius ranges from dozens of meters to hundreds of meters. Certainly, the access point may alternatively be deployed outdoors. The access point is equivalent to a bridge that connects a wired network and a wireless network. A main function of the access point is to connect various clients of a wireless network together and then connect the wireless network to an Ethernet. Specifically, the access point may be a terminal device (such as a mobile phone) or a network device (such as a router) with a Wi-Fi chip. The access point may be a device supporting the 802.11be standard. The access point may alternatively be a device supporting a plurality of WLAN standards of the 802.11 family, such as 802.11ax, 802.11ac, 802.11n, 802.11 g, 802.11b, 802.11a, and a next generation of 802.11be. The access point in this application may be a HE AP or an EHT AP, or may be an access point applicable to a future-generation Wi-Fi standard.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, a smart wearable device supporting a Wi-Fi communication function, a vehicle-mounted communication device supporting a Wi-Fi communication function, a computer supporting a Wi-Fi communication function, or the like. Optionally, the station may support the 802.11be standard. The station may also support WLAN standards of the 802.11 family, such as 802.11ax, 802.11ac, 802.11n, 802.11 g, 802.11b, 802.11a, and a next generation of 802.11be.

The access point in this application may be a HE STA or an EHT STA, or may be a STA applicable to a future-generation Wi-Fi standard.

For example, the access point and the station may be devices used in Internet of Vehicles, Internet of Things nodes, sensors, or the like in the Internet of Things (IoT), smart cameras, smart remote controls, smart water or electricity meters, or the like in a smart home, sensors in a smart city, and the like.

It should be understood that, the technical solutions in embodiments of this application are applicable to communication between an AP and one or more STAs, are also applicable to mutual communication between APs, and are further applicable to mutual communication between STAs. For ease of description, embodiments of this application are described merely by using an example in which an AP communicates with one or more STAs. However, this description manner does not have any limitation on an actual application scope of the technical solutions in embodiments of this application. This is uniformly described herein, and details are not described below again.

A wireless communication system provided in embodiments of this application may be a WLAN or a cellular network. The method may be implemented by a communication device in the wireless communication system or a chip or a processor in the communication device. The communication device may be a wireless communication device that supports parallel transmission on a plurality of links. For example, the communication device is referred to as a multi-link device or a multi-band device. Compared with a device that supports only single-link transmission, the multi-link device has higher transmission efficiency and a higher throughput. The multi-link device includes one or more affiliated stations STAs. The affiliated STA is a logical station and may operate on one link. The affiliated station may be an AP or a non-AP STA. For ease of description, in this application, a multi-link device whose affiliated station is an AP may be referred to as a multi-link AP, a multi-link AP device, or an AP multi-link device; and a multi-link device whose affiliated station is a non-AP STA may be referred to as a multi-link STA, a multi-link STA device, or a STA multi-link device.

In the schematic diagram shown in FIG. 1, if the AP supports a large bandwidth (for example, 160 MHz or 320 MHz), or in other words, the AP is an EHT AP, the AP may simultaneously send a corresponding PPDU to a plurality of non-AP STAs, that is, send an A-PPDU. For example, the AP may send a HE PPDU to a HE non-AP STA and also send an EHT PPDU to an EHT non-AP STA, so that a throughput of a BSS of the EHT AP that supports a large bandwidth can be improved.

Before the technical solutions in embodiments of this application are described, the following briefly describes technical terms related to the technical solutions in embodiments of this application.

First, a long training field (LTF) sequence is described.

The LTF sequence can be used for channel estimation. Different bandwidths have different LTF sequence designs. A value carried in each tone of each bandwidth forms an LTF sequence of the bandwidth.

In a multi-stream scenario, channel estimation for streams may be performed by sending a plurality of orthogonal frequency division multiplexing (OFDM) symbols.

Currently, there are three types of tones:
(1) a data tone, used for actual data transmission;
(2) a pilot tone, used to provide phase information and parameter tracing; and
(3) an unused tone, which is neither a data tone nor a pilot tone, and includes a central direct current (DC) tone, a guard band, and a null tone.

A manner of sending a data tone may be described as follows: To keep LTF sequences of streams orthogonal, an element in a P matrix may be multiplied by an element in an LTF sequence. For example, if a quantity of elements in the LTF sequence is 4*4, a corresponding P matrix is:

$$P_{4*4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

FIG. 2 is a schematic diagram of example construction of an LTF. Specifically, a $k^{th}$ tone carries a $k^{th}$ element $LTF_k$ in an LTF sequence, and an LTF of an $n^{th}$ OFDM symbol corresponding to an $m^{th}$ space-time stream is multiplied by an element in an $m^{th}$ row and an $n^{th}$ column in a P matrix. Therefore, after passing through a channel $H_k$, a frequency domain signal $Y_k$ received by a non-AP STA may be represented as:

$$Y_k = H_k P_{4*4} LTF_k$$

Because the P matrix is an orthogonal matrix ($P_{4*4} \times P^*_{4*4} = 4I$, where I is an identity matrix, and * is conjugate transpose of the matrix), a channel on the $k^{th}$ tone is $H_k = Y_k P^*_{4*4}/4LTF_k$. In this way, a corresponding multiple-input multiple-output (MIMO) channel on the $k^{th}$ tone may be estimated.

It should be understood that a resource unit (RU) includes both a data tone and a pilot tone. The foregoing LTF construction manner is only for the data tone. An LTF construction manner corresponding to the pilot tone is similar to the LTF construction manner for the data tone.

However, a difference between the two manners lies in that the LTF construction manner for the pilot tone uses an R matrix instead of the P matrix. A correspondence between the R matrix and the P matrix is: R(m, n)=P(1, n), to be specific, each row of the R matrix is equal to a first row of the P matrix. For specific content of the P matrix and the R matrix, refer to the 802.11ac standard.

The LTF sequence may be classified into a 1x sequence, a 2x sequence, and a 4x sequence based on a quantity of zero elements spaced between two non-zero elements. There are at least three zero elements spaced between two non-zero elements in the LTF1x sequence, there is at least one zero element between two non-zero elements in the LTF2x sequence, and consecutive non-zero elements exist in the LTF4x sequence. Because non-zero elements in the LTF4x sequence are most dense, a channel estimation result obtained by performing channel estimation by using the LTF4x sequence is most accurate.

For example, example construction manners of the LTF2x sequence and the LTF4x sequence that are based on an 80 MHz bandwidth resource are respectively shown in Table 1 and Table 2.

TABLE 1

HE LTF2x sequence

| | | | | | | | | | | | | | | | | | | | |
|---|---|---|---|---|---|---|---|---|---|---|---|---|---|---|---|---|---|---|---|
| +1 | 0 | +1 | 0 | -1 | 0 | +1 | 0 | +1 | 0 | +1 | 0 | -1 | 0 | +1 | 0 | +1 | 0 | +1 | 0 |
| +1 | 0 | -1 | 0 | -1 | 0 | -1 | 0 | +1 | 0 | -1 | 0 | -1 | 0 | +1 | 0 | +1 | 0 | -1 | 0 |
| +1 | 0 | +1 | 0 | +1 | 0 | -1 | 0 | -1 | 0 | -1 | 0 | -1 | 0 | +1 | 0 | +1 | 0 | +1 | 0 |
| +1 | 0 | -1 | 0 | +1 | 0 | +1 | 0 | +1 | 0 | -1 | 0 | +1 | 0 | -1 | 0 | -1 | 0 | +1 | 0 |
| -1 | 0 | -1 | 0 | -1 | 0 | +1 | 0 | +1 | 0 | -1 | 0 | -1 | 0 | -1 | 0 | +1 | 0 | -1 | 0 |
| -1 | 0 | +1 | 0 | -1 | 0 | +1 | 0 | +1 | 0 | -1 | 0 | +1 | 0 | +1 | 0 | -1 | 0 | +1 | 0 |
| -1 | 0 | -1 | 0 | -1 | 0 | +1 | 0 | -1 | 0 | -1 | 0 | -1 | 0 | -1 | 0 | +1 | 0 | -1 | 0 |
| -1 | 0 | +1 | 0 | +1 | 0 | -1 | 0 | +1 | 0 | +1 | 0 | +1 | 0 | -1 | 0 | -1 | 0 | -1 | 0 |
| +1 | 0 | +1 | 0 | -1 | 0 | +1 | 0 | +1 | 0 | 0 | -1 | 0 | +1 | 0 | +1 | 0 | +1 | 0 | +1 | 0 |
| +1 | 0 | -1 | 0 | -1 | 0 | -1 | 0 | +1 | 0 | +1 | 0 | +1 | 0 | -1 | 0 | 0 | -1 | 0 | +1 | 0 |
| +1 | 0 | +1 | 0 | -1 | 0 | +1 | 0 | +1 | 0 | -1 | 0 | +1 | 0 | -1 | 0 | -1 | 0 | -1 | 0 |
| -1 | 0 | +1 | 0 | -1 | 0 | -1 | 0 | -1 | 0 | +1 | 0 | -1 | 0 | +1 | 0 | +1 | 0 | -1 | 0 |
| +1 | 0 | +1 | 0 | -1 | 0 | -1 | 0 | -1 | 0 | +1 | 0 | -1 | 0 | -1 | 0 | -1 | 0 | +1 | 0 |
| -1 | 0 | +1 | 0 | +1 | 0 | -1 | 0 | +1 | 0 | +1 | 0 | +1 | 0 | -1 | 0 | -1 | 0 | +1 | 0 |
| +1 | 0 | +1 | 0 | -1 | 0 | +1 | 0 | +1 | 0 | -1 | 0 | +1 | 0 | -1 | 0 | -1 | 0 | +1 | 0 |
| -1 | 0 | +1 | 0 | +1 | 0 | +1 | 0 | -1 | 0 | +1 | 0 | +1 | 0 | +1 | 0 | +1 | 0 | -1 | 0 |
| -1 | 0 | -1 | 0 | +1 | 0 | -1 | 0 | -1 | 0 | +1 | 0 | +1 | 0 | -1 | 0 | +1 | 0 | +1 | 0 |
| +1 | 0 | -1 | 0 | -1 | 0 | -1 | 0 | -1 | 0 | +1 | 0 | +1 | 0 | +1 | 0 | -1 | 0 | -1 | 0 |
| -1 | 0 | -1 | 0 | +1 | 0 | -1 | 0 | -1 | 0 | +1 | 0 | -1 | 0 | -1 | 0 | +1 | 0 | +1 | 0 |
| +1 | 0 | -1 | 0 | -1 | 0 | +1 | 0 | +1 | 0 | +1 | 0 | -1 | 0 | +1 | 0 | +1 | 0 | -1 | 0 |
| +1 | 0 | -1 | 0 | -1 | 0 | -1 | 0 | -1 | 0 | +1 | 0 | -1 | 0 | -1 | 0 | -1 | 0 | +1 | 0 |
| -1 | 0 | +1 | 0 | +1 | 0 | -1 | 0 | +1 | 0 | +1 | 0 | -1 | 0 | +1 | 0 | +1 | 0 | -1 | 0 |
| -1 | 0 | +1 | 0 | -1 | 0 | 0 | -1 | 0 | +1 | 0 | +1 | 0 | +1 | 0 | +1 | 0 | -1 | 0 | | |
| +1 | 0 | -1 | 0 | -1 | 0 | -1 | 0 | +1 | 0 | -1 | 0 | -1 | 0 | -1 | 0 | -1 | 0 | +1 | 0 |
| +1 | 0 | +1 | 0 | +1 | 0 | -1 | 0 | -1 | 0 | -1 | 0 | +1 | 0 | +1 | 0 | +1 | 0 | 0 | 0 |
| 0 | 0 | 0 | 0 | +1 | 0 | -1 | 0 | -1 | 0 | +1 | 0 | +1 | 0 | -1 | 0 | +1 | 0 | -1 | 0 |
| -1 | 0 | -1 | 0 | +1 | 0 | +1 | 0 | +1 | 0 | +1 | 0 | -1 | 0 | +1 | 0 | +1 | 0 | +1 | 0 |
| -1 | 0 | +1 | 0 | -1 | 0 | -1 | 0 | -1 | 0 | -1 | 0 | +1 | 0 | +1 | 0 | +1 | 0 | -1 | 0 |
| +1 | 0 | +1 | 0 | -1 | 0 | -1 | 0 | +1 | 0 | 0 | -1 | 0 | +1 | 0 | +1 | 0 | -1 | 0 | -1 | 0 |
| +1 | 0 | -1 | 0 | +1 | 0 | +1 | 0 | +1 | 0 | -1 | 0 | +1 | 0 | +1 | 0 | +1 | 0 | +1 | 0 |
| -1 | 0 | +1 | 0 | -1 | 0 | +1 | 0 | +1 | 0 | -1 | 0 | -1 | 0 | -1 | 0 | +1 | 0 | +1 | 0 |
| -1 | 0 | -1 | 0 | -1 | 0 | +1 | 0 | -1 | 0 | +1 | 0 | +1 | 0 | +1 | 0 | -1 | 0 | +1 | 0 |
| +1 | 0 | +1 | 0 | +1 | 0 | -1 | 0 | -1 | 0 | -1 | 0 | +1 | 0 | +1 | 0 | +1 | 0 | +1 | 0 |
| -1 | 0 | -1 | 0 | -1 | 0 | +1 | 0 | -1 | 0 | -1 | 0 | +1 | 0 | +1 | 0 | -1 | 0 | +1 | 0 |
| +1 | 0 | +1 | 0 | -1 | 0 | -1 | 0 | -1 | 0 | -1 | 0 | +1 | 0 | -1 | 0 | -1 | 0 | -1 | 0 |
| +1 | 0 | -1 | 0 | +1 | 0 | +1 | 0 | -1 | 0 | +1 | 0 | -1 | 0 | -1 | 0 | +1 | 0 | -1 | 0 |
| -1 | 0 | -1 | 0 | +1 | 0 | +1 | 0 | -1 | 0 | -1 | 0 | +1 | 0 | -1 | 0 | -1 | 0 | -1 | 0 |
| +1 | 0 | -1 | 0 | +1 | 0 | +1 | 0 | -1 | 0 | +1 | 0 | +1 | 0 | +1 | 0 | -1 | 0 | +1 | 0 |
| +1 | 0 | -1 | 0 | +1 | 0 | +1 | 0 | -1 | 0 | +1 | 0 | -1 | 0 | -1 | 0 | -1 | 0 | +1 | 0 |
| -1 | 0 | -1 | 0 | -1 | 0 | -1 | 0 | +1 | 0 | +1 | 0 | +1 | 0 | +1 | 0 | -1 | 0 | +1 | 0 |
| +1 | 0 | +1 | 0 | -1 | 0 | -1 | 0 | +1 | 0 | +1 | 0 | +1 | 0 | -1 | 0 | -1 | 0 | -1 | 0 |
| +1 | 0 | +1 | 0 | +1 | 0 | +1 | 0 | -1 | 0 | +1 | 0 | +1 | 0 | +1 | 0 | -1 | 0 | +1 | 0 |
| -1 | 0 | -1 | 0 | -1 | 0 | -1 | 0 | +1 | 0 | +1 | 0 | +1 | 0 | -1 | 0 | +1 | 0 | +1 | 0 |
| -1 | 0 | -1 | 0 | +1 | 0 | -1 | 0 | -1 | 0 | -1 | 0 | -1 | 0 | +1 | 0 | -1 | 0 | -1 | 0 |
| -1 | 0 | +1 | 0 | -1 | 0 | +1 | 0 | -1 | 0 | -1 | 0 | +1 | 0 | +1 | 0 | -1 | 0 | +1 | 0 |
| -1 | 0 | -1 | 0 | +1 | 0 | -1 | 0 | -1 | 0 | -1 | 10 | +1 | 0 | +1 | 0 | -1 | 0 | -1 | 0 |
| -1 | 0 | +1 | 0 | -1 | 0 | -1 | 0 | -1 | 0 | -1 | 0 | +1 | 0 | +1 | 0 | +1 | 0 | -1 | 0 |
| +1 | 0 | +1 | 0 | +1 | 0 | +1 | 0 | -1 | 0 | -1 | 0 | -1 | 0 | -1 | 0 | +1 | 0 | +1 | 0 |
| +1 | 0 | -1 | 0 | +1 | 0 | +1 | 0 | -1 | 0 | -1 | 0 | +1 | 0 | -1 | 0 | -1 | 0 | -1 | 0 |
| +1 | 0 | +1 | 0 | +1 | 0 | +1 | 0 | -1 | 0 | +1 | 0 | +1 | 0 | +1 | 0 | -1 | 0 | +1 | 0 |
| +1 | | | | | | | | | | | | | | | | | | | |

TABLE 2

HE LTF4x sequence

| | | | | | | | | | | | | | | | | | | | |
|---|---|---|---|---|---|---|---|---|---|---|---|---|---|---|---|---|---|---|---|
| +1 | +1 | −1 | +1 | −1 | +1 | −1 | −1 | −1 | +1 | −1 | −1 | −1 | +1 | +1 | −1 | +1 | +1 | +1 | +1 |
| +1 | −1 | −1 | +1 | +1 | +1 | −1 | −1 | +1 | −1 | +1 | −1 | −1 | +1 | +1 | −1 | +1 | +1 | +1 | −1 |
| −1 | +1 | −1 | −1 | −1 | −1 | +1 | +1 | +1 | −1 | −1 | −1 | −1 | −1 | +1 | +1 | +1 | +1 | +1 | −1 |
| +1 | −1 | +1 | +1 | +1 | −1 | +1 | +1 | −1 | −1 | −1 | +1 | −1 | +1 | −1 | −1 | +1 | +1 | −1 | +1 |
| −1 | +1 | +1 | +1 | +1 | +1 | −1 | −1 | +1 | +1 | +1 | −1 | +1 | +1 | −1 | −1 | −1 | +1 | −1 | +1 |
| +1 | −1 | +1 | +1 | −1 | +1 | −1 | −1 | +1 | +1 | +1 | +1 | −1 | +1 | +1 | +1 | +1 | +1 | +1 | −1 |
| +1 | +1 | −1 | −1 | −1 | +1 | −1 | −1 | +1 | −1 | +1 | −1 | +1 | −1 | +1 | −1 | +1 | −1 | +1 | +1 |
| +1 | +1 | +1 | −1 | +1 | +1 | +1 | −1 | −1 | +1 | −1 | −1 | −1 | −1 | +1 | +1 | −1 | −1 | −1 | −1 |
| −1 | +1 | −1 | +1 | −1 | +1 | −1 | −1 | +1 | −1 | −1 | −1 | +1 | +1 | −1 | +1 | +1 | +1 | +1 | +1 |
| −1 | −1 | −1 | +1 | +1 | +1 | −1 | +1 | +1 | +1 | +1 | +1 | +1 | +1 | −1 | +1 | +1 | +1 | +1 | −1 |
| +1 | +1 | −1 | −1 | +1 | −1 | −1 | −1 | −1 | +1 | −1 | −1 | +1 | −1 | −1 | +1 | +1 | +1 | +1 | +1 |
| −1 | −1 | +1 | +1 | +1 | −1 | +1 | +1 | −1 | −1 | +1 | +1 | +1 | −1 | +1 | +1 | −1 | +1 | −1 | +1 |
| −1 | −1 | +1 | −1 | −1 | +1 | +1 | +1 | +1 | −1 | +1 | +1 | +1 | +1 | −1 | +1 | −1 | +1 | −1 | −1 |
| −1 | −1 | +1 | +1 | −1 | +1 | +1 | −1 | +1 | −1 | +1 | −1 | +1 | −1 | +1 | +1 | −1 | −1 | −1 | −1 |
| −1 | +1 | +1 | −1 | +1 | +1 | −1 | −1 | −1 | −1 | +1 | +1 | +1 | +1 | −1 | +1 | −1 | −1 | −1 | −1 |
| −1 | −1 | −1 | +1 | −1 | −1 | −1 | +1 | −1 | +1 | +1 | −1 | +1 | −1 | +1 | −1 | +1 | −1 | −1 | −1 |
| +1 | −1 | +1 | −1 | −1 | −1 | −1 | +1 | +1 | −1 | −1 | +1 | −1 | −1 | +1 | +1 | +1 | −1 |
| +1 | −1 | −1 | +1 | −1 | −1 | +1 | −1 | +1 | +1 | +1 | +1 | +1 | −1 | −1 | +1 | +1 | +1 | +1 | +1 |
| +1 | −1 | +1 | −1 | −1 | −1 | +1 | −1 | +1 | −1 | +1 | −1 | −1 | −1 | +1 | −1 | +1 | −1 |
| +1 | −1 | +1 | +1 | +1 | −1 | +1 | +1 | −1 | −1 | −1 | −1 | −1 | +1 | −1 | +1 | +1 | −1 |
| −1 | −1 | −1 | +1 | −1 | +1 | −1 | +1 | +1 | −1 | −1 | +1 | −1 | −1 | −1 | +1 | −1 | +1 | +1 |
| +1 | +1 | −1 | −1 | −1 | +1 | +1 | +1 | −1 | +1 | +1 | +1 | +1 | +1 | −1 | +1 | +1 |
| +1 | +1 | −1 | −1 | +1 | +1 | +1 | −1 | −1 | +1 | −1 | +1 | −1 | +1 | −1 | +1 | +1 | +1 |
| +1 | +1 | −1 | −1 | +1 | +1 | +1 | −1 | −1 | +1 | −1 | −1 | +1 | −1 | +1 | +1 | +1 | +1 |
| −1 | +1 | −1 | −1 | −1 | +1 | −1 | +1 | −1 | −1 | −1 | −1 | +1 | +1 | +1 | −1 | −1 | +1 | 0 | 0 |
| 0 | 0 | 0 | +1 | −1 | −1 | −1 | −1 | −1 | +1 | −1 | +1 | +1 | −1 | −1 | +1 | +1 | −1 | +1 |
| −1 | +1 | +1 | −1 | −1 | +1 | −1 | −1 | −1 | +1 | −1 | +1 | +1 | +1 | +1 | −1 | +1 | +1 |
| +1 | +1 | +1 | +1 | +1 | −1 | +1 | −1 | −1 | +1 | −1 | +1 | +1 | +1 | +1 | −1 | −1 | +1 |
| −1 | −1 | −1 | +1 | +1 | −1 | −1 | +1 | −1 | −1 | −1 | −1 | −1 | +1 | +1 | −1 | −1 |
| −1 | −1 | −1 | +1 | −1 | −1 | +1 | +1 | +1 | −1 | +1 | +1 | −1 | +1 | +1 | −1 | −1 | −1 |
| −1 | −1 | +1 | +1 | −1 | −1 | −1 | −1 | +1 | −1 | +1 | +1 | +1 | +1 | +1 | −1 | −1 | −1 |
| +1 | −1 | +1 | −1 | −1 | −1 | −1 | −1 | +1 | +1 | −1 | −1 | +1 | −1 | −1 | +1 | +1 | −1 |
| +1 | −1 | −1 | +1 | −1 | −1 | +1 | −1 | +1 | +1 | −1 | +1 | −1 | −1 | −1 | +1 | +1 | −1 |
| +1 | +1 | −1 | +1 | +1 | −1 | −1 | +1 | −1 | +1 | −1 | −1 | −1 | −1 | −1 | +1 |
| −1 | +1 | +1 | −1 | +1 | +1 | −1 | −1 | −1 | −1 | +1 | −1 | +1 | +1 | +1 | −1 | −1 | +1 |
| +1 | +1 | +1 | −1 | +1 | −1 | −1 | −1 | −1 | +1 | +1 | −1 | −1 | −1 | +1 | +1 | −1 | +1 |
| +1 | +1 | +1 | +1 | −1 | +1 | −1 | +1 | −1 | −1 | −1 | +1 | +1 | −1 | +1 | +1 | +1 | +1 |
| −1 | −1 | −1 | +1 | −1 | −1 | +1 | +1 | +1 | −1 | +1 | +1 | −1 | +1 | −1 | +1 | −1 | +1 |
| +1 | −1 | +1 | −1 | −1 | +1 | −1 | +1 | −1 | +1 | +1 | −1 | −1 | +1 | −1 | −1 | −1 | +1 |
| −1 | −1 | −1 | −1 | −1 | +1 | +1 | +1 | +1 | +1 | −1 | −1 | +1 | −1 | −1 | −1 | +1 |
| +1 | −1 | −1 | +1 | +1 | −1 | +1 | +1 | −1 | +1 | +1 | +1 | +1 | +1 | −1 | −1 | +1 |
| +1 | +1 | +1 | +1 | −1 | −1 | −1 | +1 | +1 | −1 | +1 | −1 | −1 | −1 | +1 | −1 | +1 | +1 |
| +1 | +1 | +1 | +1 | −1 | −1 | +1 | +1 | +1 | +1 | −1 | +1 | −1 | −1 | +1 | −1 | −1 |
| +1 | −1 | +1 | −1 | +1 | −1 | +1 | +1 | −1 | +1 | −1 | −1 | +1 | −1 | −1 | +1 | −1 |
| +1 | +1 | −1 | +1 | +1 | +1 | −1 | −1 | +1 | −1 | −1 | −1 | +1 | +1 | +1 | −1 | +1 |
| +1 | −1 | +1 | +1 | +1 | −1 | −1 | +1 | +1 | −1 | −1 | −1 | −1 | −1 | −1 | −1 | +1 |
| −1 | +1 | −1 | +1 | +1 | −1 | +1 | +1 | −1 | +1 | −1 | −1 | +1 | +1 | −1 | +1 | +1 | −1 |
| −1 | +1 | +1 | +1 | +1 | −1 | −1 | +1 | −1 | −1 | −1 | +1 | −1 | −1 | −1 | +1 | −1 | −1 |
| −1 | −1 | +1 | +1 | +1 | −1 | +1 | +1 | −1 | −1 | −1 | +1 | −1 | −1 | −1 | −1 | +1 | +1 |
| +1 | −1 | −1 | −1 | −1 | +1 | −1 | −1 | +1 | +1 | +1 | −1 | +1 | +1 | −1 | −1 | +1 | −1 | +1 | −1 |
| +1 | | | | | | | | | | | | | | | | | | | |

It should be understood that different WLAN standards specify LTF1x, LTF2x, and LTF4x sequences of different bandwidths. For example, the 802.1ax standard separately specifies LTF1x sequences, LTF2x sequences, and LTF4x sequences of bandwidths of 20 MHz, 40 MHz, 80 MHz, and 160 MHz. A specification of the LTF sequence in the 802.1be standard is consistent with the specification in the 802.1ax protocol, and only an LTF1x sequence, an LTF2x sequence, and an LTF4x sequence are designed for a newly added 320 MHz bandwidth.

Second, an A-PPDU aggregation type is described.

FIG. 3 is a schematic diagram of an example A-PPDU aggregation type. Specifically, as shown in FIG. 3, the A-PPDU aggregation type includes the following several types.

Type 1 represents a manner of aggregating a HE PPDU and an EHT PPDU when a bandwidth resource is 320 MHz and primary 160 MHz is located on lower 160 MHz of 320 MHz, and the HE PPDU is located on the primary 160 MHz of the 320 MHz bandwidth resource.

Type 2 represents a manner of aggregating a HE PPDU and an EHT PPDU when a bandwidth resource is 320 MHz and primary 160 MHz is located on higher 160 MHz of 320 MHz, and the HE PPDU is located on the primary 160 MHz of the 320 MHz bandwidth resource.

Type 3 represents a manner of aggregating a HE PPDU and an EHT PPDU when a bandwidth resource is 160 MHz, the HE PPDU is located on lower 80 MHz of 160 MHz, and the EHT PPDU is located on higher 80 MHz of the 160 MHz.

Type 4 represents a manner of aggregating a HE PPDU and an EHT PPDU when a bandwidth resource is 160 MHz, the HE PPDU is located on higher 80 MHz of 160 MHz, and the EHT PPDU is located on lower 80 MHz of the 160 MHz.

It should be understood that, due to a limitation of MAC scheduling, a HE STA can be located only on the primary 160 MHz. The primary 160 MHz is the lower 160 MHz or the higher 160 MHz of 320 MHz, which is specifically notified by an AP to a non-AP STA.

It should be understood that, for Type 1, pilot configuration is performed on the lower 160 MHz of the 320 MHz bandwidth resource based on a tone plan in the 802.11ax standard, and pilot configuration is performed on the higher 160 MHz of the 320 MHz bandwidth resource based on a tone plan in the 802.11be standard; for Type 2, pilot configuration is performed on the higher 160 MHz of the 320 MHz bandwidth resource based on the tone plan in the 802.11ax standard, and pilot configuration is performed on the lower 160 MHz of the 320 MHz bandwidth resource based on the tone plan in the 802.11be standard; for Type 3, pilot configuration is performed on the lower 80 MHz of the 160 MHz bandwidth resource based on the tone plan in the 802.11ax standard, and pilot configuration is performed on the higher 80 MHz of the 160 MHz bandwidth resource based on the tone plan in the 802.11be standard; and for Type 4, pilot configuration is performed on the higher 80 MHz of the 160 MHz bandwidth resource based on the tone plan in the 802.11ax standard, and pilot configuration is performed on the lower 80 MHz of the 160 MHz bandwidth resource based on the tone plan in the 802.11be standard.

It should be understood that, in the foregoing several A-PPDU aggregation types, the HE PPDU uses a HE pilot configuration manner, and the EHT PPDU uses an EHT pilot configuration manner.

It should be understood that the several A-PPDU aggregation types shown in FIG. 3 are merely used as examples for understanding. The technical solutions in embodiments of this application are not necessarily limited to the several A-PPDU aggregation manners shown in FIG. 3, and may be further applicable to another A-PPDU aggregation type that is not shown. This is not specifically limited in this embodiment of this application.

It should be noted that, embodiments of this application do not relate to changing a pilot location of a HE PPDU and/or a pilot location of an EHT PPDU, and usually relate to changing a manner of sending an LTF sequence of the HE PPDU and/or an LTF sequence of the EHT PPDU.

It should be further noted that the LTF sequence in embodiments of this application may be an LTF2x sequence, or may be an LTF4x sequence. This is not specifically limited in embodiments of this application.

Third, orthogonal frequency division multiple access (OFDMA) is described.

The OFDMA is evolution of an orthogonal frequency division multiplexing (OFDM) technology and is a combination of the OFDM and a frequency division multiple access (FDMA) technology.

Specifically, an OFDMA system divides a transmission bandwidth into a series of orthogonal tone sets that do not overlap each other, and allocates different tone sets to different users to implement multiple access. The OFDMA system can dynamically allocate an available bandwidth resource to a user that needs a bandwidth resource, so that it is easy to optimize utilization of system resources. Because different users occupy tone sets that do not overlap each other, in an ideal synchronization case, no multiple-user interference, that is, no multiple access interference (MAI), occurs in the system.

The OFDM uses a frequency domain equalization technology, and therefore, precision of channel estimation greatly affects communication performance. However, the OFDM system has a disadvantage of a high PAPR, and especially in a large bandwidth, more tones lead to a more severe PAPR. The high PAPR leads to nonlinear signal distortion and degrades system performance. Therefore, to perform channel estimation more precisely, maintaining a low PAPR is an important indicator of LTF sequence design.

However, in a scenario of downlink transmission of an A-PPDU, a low PAPR of an LTF sequence cannot be effectively ensured.

Figure 4:
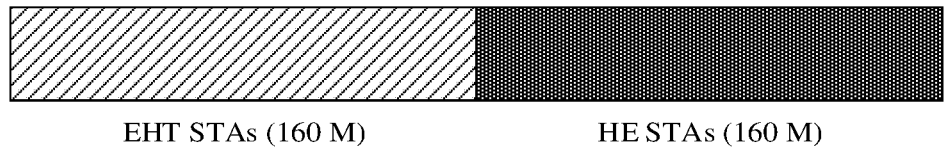
FIG. 4 is a schematic diagram of an example LTF sequence sending manner applied to an A-PPDU.

FIG. 4 is a schematic diagram of an example LTF sequence sending manner applied to an A-PPDU. Specifically, in downlink transmission of an A-PPDU including a HE PPDU and an EHT PPDU, when sending the HE PPDU to a HE non-AP STA, an AP sends a HE LTF sequence based on a pilot location of the HE LTF sequence in a bandwidth part occupied by the HE PPDU; and when sending the EHT PPDU to an EHT non-AP STA, the AP sends an EHT LTF sequence based on a pilot location of the EHT LTF sequence in a bandwidth part occupied by the EHT PPDU.

However, if the LTF sequences respectively corresponding to the HE PPDU and the EHT PPDU are directly combined and sent, a large PAPR is generated.

In view of the foregoing technical problem, embodiments of this application provide a data transmission method and a communication apparatus, to adjust an LTF sequence sending manner used in downlink transmission of an A-PPDU, so that a total PAPR generated in downlink transmission of the A-PPDU can be effectively reduced in this application.

Figure 5:
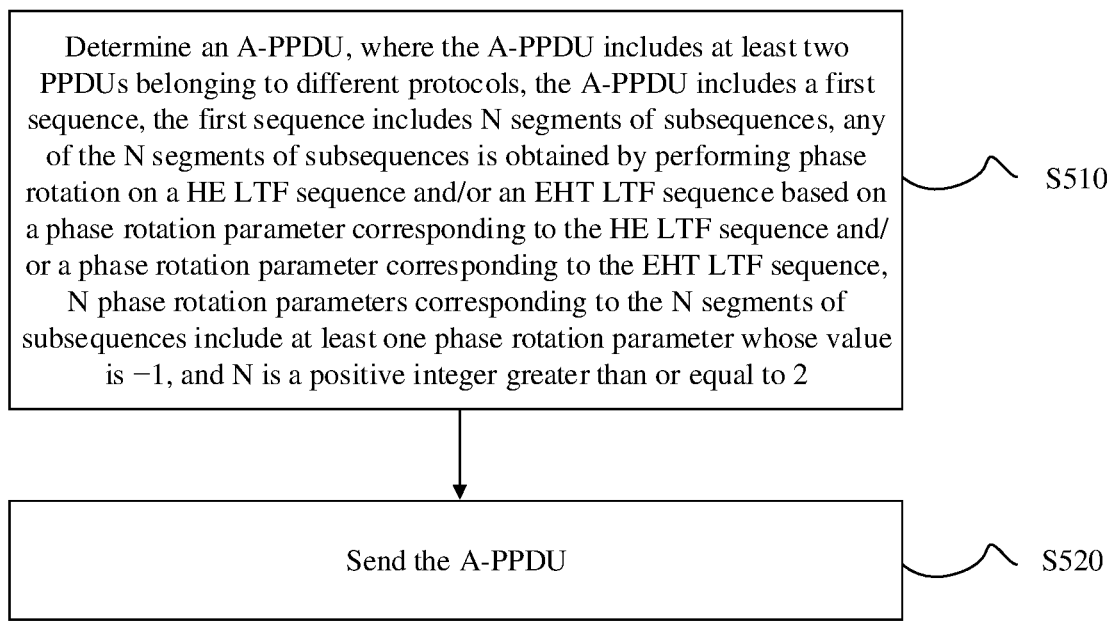
FIG. 5 is a schematic flowchart of an example data transmission method according to an embodiment of this application.
Figure 6:
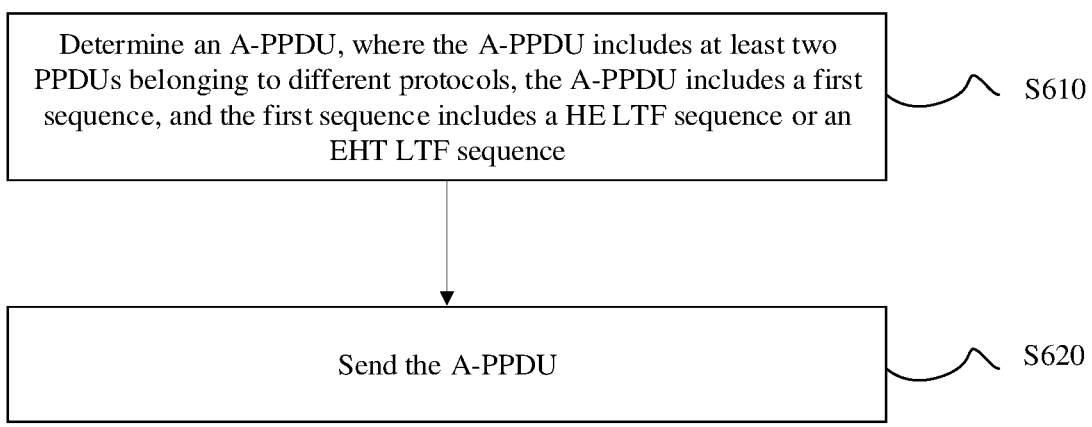
FIG. 6 is a schematic flowchart of another example data transmission method according to an embodiment of this application.

The following describes the data transmission method provided in this application with reference to FIG. 5 to FIG. 6.

To better understand the technical solutions in embodiments of this application, explanations of some technical terms related to the technical solutions provided in embodiments of this application are merely examples, and are not limited herein.

First, an EHT LTF 320 means that when a bandwidth resource is 320 MHz, the sequence is an EHT LTF sequence sent on the 320 MHz bandwidth resource, and the EHT LTF sequence occupies all bandwidth resources of the 320 MHz bandwidth resource. An EHT LTF 320_P1 means that when a bandwidth resource is 320 MHz, the sequence is a first part of an EHT LTF sequence sent on the 320 MHz bandwidth resource, and the first part of the sequence occupies a first 80 MHz bandwidth resource of the 320 MHz bandwidth resource. An EHT LTF 320_P2 means that when a bandwidth resource is 320 MHz, the sequence is a second part of an EHT LTF sequence sent on the 320 MHz bandwidth resource, and the second part of the sequence occupies a second 80 MHz bandwidth resource of the 320 MHz bandwidth resource. An EHT LTF 320_P3 means that when a bandwidth resource is 320 MHz, the sequence is a third part of an EHT LTF sequence sent on the 320 MHz bandwidth resource, and the third part of the sequence occupies a third 80 MHz bandwidth resource of the 320 MHz bandwidth resource. An EHT LTF 320_P4 means that when a bandwidth resource is 320 MHz, the sequence is a fourth part of an EHT LTF sequence sent on the 320 MHz bandwidth resource, and the fourth part of the sequence occupies a fourth 80 MHz bandwidth resource of the 320 MHz bandwidth resource. An EHT LTF 160 means that when a bandwidth resource is 160 MHz, the sequence is an EHT LTF sequence sent on the 160 MHz bandwidth resource, and the EHT LTF sequence occupies all bandwidth resources of the 160 MHz bandwidth resource. An EHT LTF 160_P1 means that when a bandwidth resource is 160 MHz, the sequence is a first part of an EHT LTF sequence sent on the 160 MHz bandwidth resource, and the first part of the sequence occupies a lower 80 MHz bandwidth resource of the 160 MHz bandwidth resource. An EHT LTF 160_P2 means that when a bandwidth resource is 160 MHz, the sequence is a second part of an EHT LTF sequence sent on the 160 MHz bandwidth resource, and the second part of the sequence occupies a higher 80 MHz bandwidth resource of the 160 MHz bandwidth resource. An EHT LTF 80 means that when a bandwidth resource is 80 MHz, the sequence is an EHT LTF sequence sent on the 80 MHz bandwidth resource, and the EHT LTF sequence occupies all bandwidth resources of the 80 MHz bandwidth resource.

Second, a HE LTF 160 means that when a bandwidth resource is 160 MHz, the sequence is a HE LTF sequence sent on the 160 MHz bandwidth resource, and the HE LTF sequence occupies all bandwidth resources of the 160 MHz bandwidth resource. A HE LTF 160_P1 means that when a bandwidth resource is 160 MHz, the sequence is a first part of a HE LTF sequence sent on the 160 MHz bandwidth resource, and the first part of the sequence occupies a lower 80 MHz bandwidth resource of the 160 MHz bandwidth resource. A HE LTF 160_P2 means that when a bandwidth resource is 160 MHz, the sequence is a second part of a HE LTF sequence sent on the 160 MHz bandwidth resource, and the second part of the sequence occupies a higher 80 MHz bandwidth resource of the 160 MHz bandwidth resource. A HE LTF 80 means that when a bandwidth resource is 80 MHz, the sequence is a HE LTF sequence sent on the 80 MHz bandwidth resource, and the HE LTF sequence occupies all bandwidth resources of the 80 MHz bandwidth resource.

FIG. 5 is a schematic diagram of an example data transmission method according to an embodiment of this application. The method #500 is performed by a network device.

S510: Determine an A-PPDU, where the A-PPDU includes at least two PPDUs belonging to different protocols, the A-PPDU includes a first sequence, the first sequence includes N segments of subsequences, any of the N segments of subsequences is obtained by performing phase rotation on a HE LTF sequence and/or an EHT LTF sequence based on a phase rotation parameter corresponding to the HE LTF sequence and/or a phase rotation parameter corresponding to the EHT LTF sequence, N phase rotation parameters corresponding to the N segments of subsequences include at least one phase rotation parameter whose value is −1, and N is a positive integer greater than or equal to 2.

It should be understood that the A-PPDU includes a plurality of PPDUs that belong to different protocols. For example, the A-PPDU includes a HE PPDU and an EHT PPDU, or the A-PPDU includes a very high throughput (VHT)-PPDU and a high throughput (HT)-PPDU, or the A-PPDU may include a HE PPDU, an EHT PPDU, a VHT PPDU, and an HT PPDU. This is not specifically limited in this embodiment of this application.

It should be understood that the first sequence included in the A-PPDU includes a plurality of segments of LTF sequences. For example, the first sequence includes N segments of subsequences. Sequence lengths of any two segments of LTF sequences in the N segments of subsequences may keep consistent, or may keep inconsistent, where N is a positive integer greater than or equal to 2.

It should be understood that all the segments of LTF sequences in the N segments of subsequences may belong to a same type, for example, all the segments of LTF sequences are EHT LTF sequences; or may belong to different types, for example, some subsequences are HE LTF sequences, and the other subsequences are EHT LTF sequences. This is not specifically limited in this embodiment of this application.

It can be learned from the above that, when the network device directly sends the LTF sequence included in the A-PPDU, a total PAPR generated in downlink transmission of the A-PPDU is large. Therefore, an LTF sequence sending manner used in downlink transmission of the A-PPDU needs to be adjusted.

Specifically, the N segments of subsequences of the first sequence are obtained by performing, based on a corresponding phase rotation parameter, phase rotation on a HE LTF sequence and/or an EHT LTF sequence corresponding to each segment of subsequence.

For example, when the first sequence includes four segments of subsequences, which are respectively a first segment of subsequence, a second segment of subsequence, a third segment of subsequence, and a fourth segment of subsequence, correspondingly, a first phase rotation parameter, a second phase rotation parameter, a third phase rotation parameter, and a fourth phase rotation parameter exist, the first phase rotation parameter corresponds to the first segment of subsequence, the second phase rotation parameter corresponds to the second segment of subsequence, the third phase rotation parameter corresponds to the third segment of subsequence, and the fourth phase rotation parameter corresponds to the fourth segment of subsequence.

More specifically, the network device performs phase rotation on the first segment of subsequence based on the first phase rotation parameter to obtain a first segment of subsequence obtained after the phase rotation, performs phase rotation on the second segment of subsequence based on the second phase rotation parameter to obtain a second segment of subsequence obtained after the phase rotation, performs phase rotation on the third segment of subsequence based on the third phase rotation parameter to obtain a third segment of subsequence obtained after the phase rotation, and performs phase rotation on the fourth segment of subsequence based on the fourth phase rotation parameter to obtain a fourth segment of subsequence obtained after the phase rotation.

It should be understood that, the first segment of subsequence may be a HE LTF sequence, the second segment of subsequence may be a HE LTF sequence, the third segment of subsequence may be an EHT LTF sequence, and the fourth segment of subsequence may be an EHT LTF sequence; or the first segment of subsequence may be an EHT LTF sequence, the second segment of subsequence may be an EHT LTF sequence, the third segment of subsequence may be a HE LTF sequence, and the fourth segment of subsequence may be a HE LTF sequence; or the first segment of subsequence may be an EHT LTF sequence, the second segment of subsequence may be an EHT LTF sequence, the third segment of subsequence may be an EHT LTF sequence, and the fourth segment of subsequence may be an EHT LTF sequence, this is not specifically limited in this embodiment of this application.

It should be noted that, the first sequence includes but is not limited to the four segments of subsequences described above, and may include more subsequences. This is not specifically limited in this embodiment of this application. However, each segment of subsequence included in the first sequence is obtained through phase rotation. A phase rotation parameter corresponding to each segment of subsequence may be 1 or −1, and at least one phase rotation parameter whose value is −1 exists in the N phase rotation parameters corresponding to the segments of subsequence.

S520: Send the A-PPDU.

Correspondingly, a terminal device receives the A-PPDU sent by the network device.

Phase rotation is performed on each segment of subsequence of the first sequence included in the A-PPDU, and the corresponding N phase rotation parameters include at least one phase rotation parameter whose value is −1, so that a manner of superposition between tones corresponding to the subsequences can be changed. In this way, a total PAPR generated in downlink transmission of the A-PPDU can be effectively reduced in this application.

It should be understood that a quantity of phase rotation parameters whose values are −1 in the N phase rotation parameters is less than or equal to N.

In a possible implementation, the A-PPDU includes a HE PPDU and an EHT PPDU.

In this way, phase rotation is performed on each segment of subsequence of the first sequence included in the A-PPDU including the HE PPDU and the EHT PPDU, and corresponding phase rotation parameters include at least one phase rotation parameter whose value is −1. In this way, a total PAPR generated in downlink transmission of the A-PPDU including the HE PPDU and the EHT PPDU can be effectively reduced in this application.

In a possible implementation, the network device sends the A-PPDU on a 320 MHz bandwidth resource.

Specifically, when a bandwidth resource is 320 MHz, HE LTF sequences corresponding to some subsequences of the first sequence may be located on a lower 160 MHz bandwidth resource of the 320 MHz bandwidth resource, and EHT LTF sequences corresponding to the other subsequences of the first sequence may be located on a higher 160 MHz bandwidth resource of the 320 MHz bandwidth resource. More specifically, the foregoing deployment manner may correspond to Type 1 shown in FIG. 3.

Alternatively, HE LTF sequences corresponding to some subsequences of the first sequence may be located on a higher 160 MHz bandwidth resource of the 320 MHz bandwidth resource, and EHT LTF sequences corresponding to the other subsequences of the first sequence may be located on a lower 160 MHz bandwidth resource of the 320 MHz bandwidth resource. More specifically, the foregoing deployment manner may correspond to Type 2 shown in FIG. 3.

In a possible implementation, when N=4, the four phase rotation parameters include at least one of the following groups:

{1, −1, −1,−1}, {, −1, 1, 1}, {1, 1, −1, 1}, and {1, 1, 1, −1};

{−1, 1, 1, 1}, {−1, 1, −1, −1}, {−1, −1, 1, −1}, and {−1, −1, −1, 1}

{1, −1, −1, 1}, {1, −1, 1, −1}, {−1, 1, 1, −1}, and {−1, 1, −1, 1}; and

{1, 1, −1, −1} and {−1, −1, 1, 1}.

Specifically, when the first sequence includes a first segment of HE LTF subsequence, a second segment of HE LTF subsequence, a third segment of EHT LTF subsequence, and a fourth segment of EHT LTF subsequence, manners of combining the first phase rotation parameter, the second phase rotation parameter, the third phase rotation parameter, and the fourth phase rotation parameter are shown as follows:

{$HE\ LTF$ 160_P1∗1, $HE\ LTF$ 160_P2∗−1, $EHT\ LTF$ 160_P1∗−1, $EHT\ LTF$ 160_P2∗−1};

{$HE\ LTF$ 160_P1∗1, $HE\ LTF$ 160_P2∗−1, $EHT\ LTF$ 160_P1∗1, $EHT\ LTF$ 160_P2∗1};

{$HE\ LTF$ 160_P1∗1, $HE\ LTF$ 160_P2∗1, $EHT\ LTF$ 160_P1∗−1, $EHT\ LTF$ 160_P2∗1};

{$HE\ LTF$ 160_P1∗1, $HE\ LTF$ 160_P2∗1, $EHT\ LTF$ 160_P1∗1, $EHT\ LTF$ 160_P2∗−1};

{$HE\ LTF$ 160_P1∗−1, $HE\ LTF$ 160_P2∗1, $EHT\ LTF$ 160_P1∗1, $EHT\ LTF$ 160_P2∗1};

{$HE\ LTF$ 160_P1∗−1, $HE\ LTF$ 160_P2∗1, $EHT\ LTF$ 160_P1∗−1, $EHT\ LTF$ 160_P2∗−1};

{$HE\ LTF$ 160_P1∗−1, $HE\ LTF$ 160_P2∗−1, $EHT\ LTF$ 160_P1∗1, $EHT\ LTF$ 160_P2∗−1};

and
{HE LTF **160_P1\*-1, HE LTF 160_P2\*-1, EHT LTF 160_P1\*-1, EHT LTF 160_P2\*1**}.

It should be understood that the foregoing several combination forms are merely used as examples for description, and do not include all the foregoing combination forms.

Alternatively, when the first sequence includes a first segment of EHT LTF subsequence, a second segment of EHT LTF subsequence, a third segment of HE LTF subsequence, and a fourth segment of HE LTF subsequence, manners of combining the first phase rotation parameter, the second phase rotation parameter, the third phase rotation parameter, and the fourth phase rotation parameter are shown as follows:

{EHT LTF **160_P1\*1, EHT LTF 160_P2\*-1, HE LTF 160_P1\*-1, HE LTF 160_P2\*-1**};
{EHT LTF **160_P1\*1, EHT LTF 160_P2\*-1, HE LTF 160_P1\*1, HE LTF 160_P2\*1**};
{EHT LTF **160_P1\*1, EHT LTF 160_P2\*1, HE LTF 160_P1\*-1, HE LTF 160_P2\*1**};
{EHT LTF **160_P1\*1, EHT LTF 160_P2\*1, HE LTF 160_P1\*1, HE LTF 160_P2\*-1**};
{EHT LTF **160_P1\*-1, EHT LTF 160_P2\*1, HE LTF 160_P1\*1, HE LTF 160_P2\*1**};
{EHT LTF **160_P1\*-1, EHT LTF 160_P2\*1, HE LTF 160_P1\*-1, HE LTF 160_P2\*-1**};
{EHT LTF **160_P1\*-1, EHT LTF 160_P2\*-1, HE LTF 160_P1\*1, HE LTF 160_P2\*-1**}; and
{EHT LTF **160_P1\*-1, EHT LTF 160_P2\*-1, HE LTF 160_P1\*-1, HE LTF 160_P2\*1**}.

It should be understood that the foregoing several combination forms are merely used as examples for description, and do not include all the foregoing combination forms.

Through combinations of the N segments of subsequences and the corresponding N phase rotation parameters, a manner of superposition between tones can be changed. In this way, a total PAPR generated in downlink transmission of the A-PPDU can be effectively reduced in this application.

In a possible implementation, when the first sequence includes an EHT LTF sequence and a HE LTF sequence, the EHT LTF sequence is a half of an EHT LTF sequence corresponding to a 320 MHz bandwidth resource. For example, the half of the EHT LTF sequence may be a second half of the EHT LTF sequence corresponding to the 320 MHz bandwidth resource. For details, refer to a fifth row and a sixth row of Table 3 and a fourth row of Table 4. Alternatively, the half of the EHT LTF sequence may be a first half of the EHT LTF sequence corresponding to the 320 MHz bandwidth resource. For details, refer to a fifth row and a sixth row of Table 5 and a fourth row and a fifth row of Table 6.

The following describes beneficial effects obtained based on the phase rotation parameter solution in this embodiment of this application.

TABLE 3

| LTF 4x sequence | A-PPDU aggregation type 1 | | | | | | | | |
|---|---|---|---|---|---|---|---|---|---|
| | 3*996 | | | | | 2*996 | | | 4*996 |
| {HE LTF 160, EHT LTF 160} | 8.73 | 9.02 | 8.56 | 8.94 | 9.26 | 7.58 | 7.48 | 10.01 | 9.45 |
| HE LTF 160__P1*a, HE LTF 160__P2*b, EHT LTF 160__P1*c, EHT LTF 160__P2*d} | 8.76 | 8.74 | 8.56 | 9.22 | 9.26 | 7.17 | 7.48 | 10.05 | 7.31 |
| {EHT LTF 320__P1*a, EHT LTF 320__P2*b, EHT LTF 320__P3*c, EHT LTF 320__P4*d} | 7.92 | 7.95 | 8.13 | 8.25 | 8.69 | 6.32 | 6.50 | 8.77 | 6.15 |
| {HE LTF 160__P1, HE LTF 160__P2, EHT LTF 320__P3, EHT LTF 320__P4} | 8.2 | 8.64 | 8.29 | 7.84 | 7.84 | 7.85 | 7.9 | 8.14 | 8.52 |
| {HE LTF 160__P1*a, HE LTF 160__P2*b, EHT LTF 320__P3*c, EHT LTF 320__P4*d} | 7.95 | 7.86 | 7.92 | 7.84 | 7.78 | 8.01 | 7.9 | 8.14 | 7.65 |

Table 3 shows PAPR values corresponding to different LTF sequence sending manners when an LTF sequence is the LTF4x sequence. It should be understood that 3*996, 2*996, and 4*996 in a first row of Table 3 are specific configuration forms of tones of a plurality of resource units (MRUs).

It should be understood that Table 3 shows comparison between PAPR values corresponding to different LTF sequence composition manners in a case of a same configuration form. For example, if the configuration form is 4*996, when the LTF sequence of the A-PPDU includes {HE LTF 160, EHT LTF 160}(the sequence may also be understood as an existing sending manner of the LTF sequence of the A-PPDU), a PAPR value corresponding to the LTF sequence is 9.45; when the first sequence includes {HE LTF 160_P1*a, HE LTF 160_P2*b, EHT LTF 160_P1*c, EHT LTF 160_P2*d}, a PAPR value corresponding to the first sequence is 7.31; when the first sequence includes {EHT LTF 320_P1*a, EHT LTF 320_P2*b, EHT LTF 320_P3*c, EHT LTF 320_P4*d}, a PAPR value corresponding to the first sequence is 6.15; when the first sequence includes {HE LTF 160_P1, HE LTF 160_P2, EHT LTF 320_P3, EHT LTF 320_P4}, a PAPR value corresponding to the first sequence is 8.52; and when the first sequence includes {HE LTF 160_P1*a, HE LTF 160_P2*b, EHT LTF 320_P3*c, EHT LTF 320_P4*d}, a PAPR value corresponding to the first sequence is 7.65. It can be learned from the foregoing comparison that, compared with an existing composition manner of the LTF sequence, the LTF sequence obtained by using the phase rotation solution in this embodiment of this application can generate a small PAPR value.

It should be understood that, when the first sequence includes {HE LTF 160_P1, HE LTF 160_P2, EHT LTF 320_P3, EHT LTF 320_P4}, a combination of the first phase rotation parameter, the second phase rotation parameter, the third phase rotation parameter, and the fourth phase rotation parameter that correspond to the first sequence is {1, 1, 1, 1} or {−1, −1, −1, −1}.

It should be understood that, a, b, c, and d shown in a third row, a fourth row, and a sixth row of Table 3 respectively correspond to the first phase rotation parameter, the second phase rotation parameter, the third phase rotation parameter, and the fourth phase rotation parameter.

It should be understood that, the PAPR values corresponding to the several combination manners of the first sequence shown in Table 3 are merely used as a reference, and represent approximate PAPR values corresponding to the various combination manners.

It should be noted that, {−1, −1, −1, −1} and {1, 1, 1, 1} are two equivalent combination manners. This is uniformly described herein, and is not described again in subsequent embodiments.

It can be learned that, a manner of superposition between tones may be changed by performing phase rotation on each segment of subsequence of the first sequence. In this way, a total PAPR value generated in downlink transmission of the A-PPDU can be effectively reduced in this application.

TABLE 4

| LTF 2x sequence | A-PPDU aggregation type 1 | | | | | | | | |
|---|---|---|---|---|---|---|---|---|---|
| | 3*996 | | | | | 2*996 | | | 4*996 |
| {HE LTF 160, EHT LTF 160} | 9.46 | 8.85 | 9.13 | 8.86 | 9.02 | 7.32 | 6.81 | 9.67 | 9.78 |
| {HE LTF 160__P1*a, HE LTF 160__P2*b, EHT LTF 160__P1*c, EHT LTF 160__P2*d} | 8.51 | 8.84 | 9.13 | 9.15 | 9.02 | 7.53 | 6.81 | 9.48 | 6.92 |
| {HE LTF 160__P1, HE LTF 160__P2, EHT LTF 320__P3, EHT LTF 320__P4} | 8.75 | 8.57 | 8.58 | 8.2 | 8.79 | 8.51 | 8.44 | 8.03 | 8.53 |

Table 4 shows PAPR values corresponding to different LTF sequence sending manners when an LTF sequence is the LTF2x sequence. It should be understood that 3*996, 2*996, and 4*996 in a first row of Table 4 are specific configuration forms of tones of MRUs.

It should be understood that Table 4 shows comparison between PAPR values corresponding to different LTF sequence composition manners in a case of a same configuration form. For example, if the configuration form is 4*996, when the LTF sequence of the A-PPDU includes {HE LTF 160, EHT LTF 160}(the sequence may also be understood as an existing sending manner of the LTF sequence of the A-PPDU), a PAPR value corresponding to the LTF sequence is 9.78; when the first sequence includes {HE LTF 160_P1*a, HE LTF 160_P2*b, EHT LTF 160_P1*c, EHT LTF 160_P2*d}, a PAPR value corresponding to the first sequence is 6.92; and when the first sequence includes {HE LTF 160_P1, HE LTF 160_P2, EHT LTF 320_P3, EHT LTF 320_P4}, a PAPR value corresponding to the first sequence is 8.53. It can be learned from the foregoing comparison that, compared with an existing composition manner of the LTF sequence, the LTF sequence obtained by using the phase rotation solution in this embodiment of this application can generate a small PAPR value.

It should be understood that, when the first sequence includes {HE LTF 160_P1, HE LTF 160_P2, EHT LTF 320_P3, EHT LTF 320_P4}, a combination of the first phase rotation parameter, the second phase rotation parameter, the third phase rotation parameter, and the fourth phase rotation parameter that correspond to the first sequence is {1, 1, 1, 1 or {−1, −1, −1, −1}. It should be understood that, a, b, c, and d shown in a third row of Table 4 respectively correspond to the first phase rotation parameter, the second phase rotation parameter, the third phase rotation parameter, and the fourth phase rotation parameter.

It should be understood that, the PAPR values corresponding to the several combination manners of the first sequence shown in Table 4 are merely used as a reference, and represent approximate PAPR values corresponding to the various combination manners.

It can be learned that a manner of superposition between tones corresponding to subsequences may be changed by performing phase rotation on each segment of subsequence of the first sequence. In this way, a total PAPR value generated in downlink transmission of the A-PPDU can be effectively reduced in this application.

TABLE 5

| A-PPDU aggregation type 2 | | | | | | | | | |
|---|---|---|---|---|---|---|---|---|---|
| LTF 4x sequence | 3*996 | | | | 2*996 | | | 4*996 | |
| {EHT LTF 160, HE LTF 160} | 8.72 | 8.94 | 8.54 | 9.02 | 9.26 | 7.43 | 7.59 | 10.01 | 9.43 |
| {EHT LTF 160_P1*a, EHT LTF 160_P2*b, HE LTF 160_P1*c, HE LTF 160_P2*d} | 8.72 | 9.22 | 8.76 | 8.74 | 9.26 | 7.43 | 6.79 | 10.05 | 7.14 |
| {EHT LTF 320_P1*a, EHT LTF 320_P2*b, EHT LTF 320_P3*c, EHT LTF 320_P4*d} | 7.98 | 8.16 | 7.88 | 8.00 | 8.75 | 6.74 | 6.44 | 8.66 | 6.59 |
| {EHT LTF 320_P1, EHT LTF 320_P2, HE LTF 160_P1, HE LTF 160_P2} | 7.91 | 8.27 | 7.98 | 8.55 | 7.76 | 8.01 | 8.01 | 7.96 | 8.6 |
| {EHT LTF 320_P1*a, EHT LTF 320_P2*b, HE LTF 160_P1*c, HE LTF 160_P2*d} | 7.92 | 8.06 | 8.21 | 7.95 | 7.78 | 8.01 | 8.01 | 8.06 | 7.8 |

Table 5 shows PAPR values corresponding to different LTF sequence sending manners when an LTF sequence is the LTF4x sequence. It should be understood that 3*996, 2*996, and 4*996 in a first row of Table 5 are specific configuration forms of tones of MRUs.

It should be understood that Table 5 shows comparison between PAPR values corresponding to different LTF sequence composition manners in a case of a same configuration form. For example, if the configuration form is 4*996, It should be understood that, the PAPR values corresponding to the several combination manners of the first sequence shown in Table 5 are merely used as a reference, and represent approximate PAPR values corresponding to the various combination manners.

It can be learned that, a manner of superposition between tones may be changed by performing phase rotation on each segment of subsequence of the first sequence. In this way, a total PAPR value generated in downlink transmission of the A-PPDU can be effectively reduced in this application.

TABLE 6

| | A-PPDU aggregation type 2 | | | | | | | |
|---|---|---|---|---|---|---|---|---|
| LTF 2x sequence | 3*996 | | | | 2*996 | | | 4*996 |
| {EHT LTF 160, HE LTF 160} | 9.13 | 8.86 | 9.46 | 8.85 | 9.02 | 7.23 | 6.98 | 9.67 | 9.78 |
| {EHT LTF 160_P1*a, EHT LTF 160_P2*b, HE LTF 160_P1*c, HE LTF 160_P2*d} | 8.71 | 9.24 | 8.87 | 8.85 | 9.26 | 7.49 | 6.98 | 9.67 | 7.26 |
| {EHT LTF 320_P1, EHT LTF 320_P2, HE LTF 160_P1, HE LTF 160_P2} | 8.5 | 8 | 8.3 | 8.45 | 8.16 | 8.81 | 8.55 | 8.47 | 8.61 |
| {EHT LTF 320_P1*a, EHT LTF 320_P2*b, HE LTF 160_P1*c, HE LTF 160_P2*d} | 7.97 | 8 | 8.15 | 8.46 | 7.73 | 8.81 | 8.48 | 8.47 | 8.06 | when the LTF sequence of the A-PPDU includes {EHT LTF 160, HE LTF 160}(the sequence may also be understood as an existing sending manner of the LTF sequence of the A-PPDU), a PAPR value corresponding to the LTF sequence is 9.43; when the first sequence includes {EHT LTF 160_P1*a, EHT LTF 160_P2*b, HE LTF 160_P1*c, HE LTF 160_P2*d}, a PAPR value corresponding to the first sequence is 7.14; when the first sequence includes {EHT LTF 320_P1*a, EHT LTF 320_P2*b, EHT LTF 320_P3*c, EHT LTF 320_P4*d}, a PAPR value corresponding to the first sequence is 6.59; when the first sequence includes {EHT LTF 320_P1, EHT LTF 320_P2, HE LTF 160_P1, HE LTF 160_P2}, a PAPR value corresponding to the first sequence is 8.6; and when the first sequence includes {EHT LTF 320_P1*a, EHT LTF 320_P2*b, HE LTF 160_P1*c, HE LTF 160_P2*d}, a PAPR value corresponding to the first sequence is 7.8. It can be learned from the foregoing comparison that, compared with an existing composition manner of the LTF sequence, the LTF sequence obtained by using the phase rotation solution in this embodiment of this application can generate a small PAPR value.

It should be understood that, a, b, c, and d shown in a third row and a fourth row of Table 5 respectively correspond to the first phase rotation parameter, the second phase rotation parameter, the third phase rotation parameter, and the fourth phase rotation parameter.

It should be understood that, a combination manner of the first phase rotation parameter, the second phase rotation parameter, the third phase rotation parameter, and the fourth phase rotation parameter that correspond to the fifth row of Table 5 is {1, 1, 1, 1} or {−1, −1, −1, −1}.

It should be understood that, a combination manner of the first phase rotation parameter, the second phase rotation parameter, the third phase rotation parameter, and the fourth phase rotation parameter that correspond to the sixth row of Table 5 is {1, −1, −1, 1}, {1, −1, 1, −1}, {−1, 1, 1, −1}, or {−1, 1, −1, 1}.

Table 6 shows PAPR values corresponding to different LTF sequence sending manners when an LTF sequence is the LTF2x sequence. It should be understood that 3*996, 2*996, and 4*996 in a first row of Table 6 are specific configuration forms of tones of MRUs.

It should be understood that Table 6 shows comparison between PAPR values corresponding to different LTF sequence composition manners in a case of a same configuration form. For example, if the configuration form is 4*996, when the LTF sequence of the A-PPDU includes {EHT LTF 160, HE LTF 160} (the sequence may also be understood as an existing sending manner of the LTF sequence of the A-PPDU), a PAPR value corresponding to the LTF sequence is 9.78; when the first sequence includes {EHT LTF 160_P1*a, EHT LTF 160_P2*b, HE LTF 160_P1*c, HE LTF 160_P2*d}, a PAPR value corresponding to the first sequence is 7.26; when the first sequence includes a {EHT LTF 320_P1, EHT LTF 320_P2, HE LTF 160_P1, HE LTF 160_1P2}, a PAPR value corresponding to the first sequence is 8.61; and when the first sequence includes {EHT LTF 320_P1*a, EHT LTF 320_P32*b, HE LTF 160_P1*c, HE LTF 160_P2*d}, a PAPR value corresponding to the first sequence is 8.06. It can be learned from the foregoing comparison that, compared with an existing composition manner of the LTF sequence, the LTF sequence obtained by using the phase rotation solution in this embodiment of this application can generate a small PAPR value.

It should be understood that, a, b, c, and d shown in a third row of Table 6 respectively correspond to the first phase rotation parameter, the second phase rotation parameter, the third phase rotation parameter, and the fourth phase rotation parameter.

It should be understood that, a combination manner of the first phase rotation parameter, the second phase rotation parameter, the third phase rotation parameter, and the fourth phase rotation parameter that correspond to the third row of Table 6 is {1, 1, 1, 1} or {−1, −1, −1, −1}.

It should be understood that, a combination manner of the first phase rotation parameter, the second phase rotation parameter, the third phase rotation parameter, and the fourth phase rotation parameter that correspond to the fifth row of Table 6 is {1, 1, −1, −1}, {−1, −1, 1, 1}, {1, 1, −1, 1}, or {−1, −1, 1, −1}.

It should be understood that, the PAPR values corresponding to the several combination manners of the first sequence shown in Table 6 are merely used as a reference, and represent approximate PAPR values corresponding to the various combination manners.

It can be learned that a manner of superposition between tones corresponding to subsequences may be changed by performing phase rotation on each segment of subsequence of the first sequence. In this way, a total PAPR value generated in downlink transmission of the A-PPDU can be effectively reduced in this application.

It should be noted that, the PAPR values obtained by using the technical solutions in embodiments of this application shown in FIG. 3 to Table 6 are approximate PAPR values corresponding to the foregoing listed specific combination manners of the first sequence and the N phase rotation parameters.

Through comparison, it can be learned that a manner of superposition between tones may be changed by using the phase rotation solution in this embodiment of this application. In this way, a PAPR value generated in downlink transmission of the A-PPDU can be effectively reduced in this application.

In a possible implementation, the method further includes the following steps.

S530: Determine a second data sequence, where the second data sequence is determined based on a difference sequence and a first data sequence.

S540: Send the second data sequence.

Correspondingly, the terminal device receives the second data sequence from the network device.

It should be understood that, the first data sequence is an original data sequence, the second data sequence is a to-be-sent data sequence, and the difference sequence is determined based on the first sequence.

It should be understood that, that the first data sequence is an original data sequence may be understood as a data sequence generated by the network device based on MAC transmission.

It should be understood that the difference sequence may be considered as follows: For example, if a sequence A is considered as an actually sent LTF sequence, and a sequence B is considered as an LTF sequence that needs to be sent, a difference sequence between the sequence A and the sequence B is Gapseq=A./B, where "./" means that an element in the sequence A is correspondingly divided by an element in the sequence B, and it is specified that a quotient obtained by dividing an element 0 in the sequence A by an element 0 in the sequence B is 1.

It should be understood that, that the difference sequence is determined based on the first sequence may be understood as follows: The first sequence that the network device determines to send to the terminal device is not necessarily the same as an LTF sequence determined by the terminal device.

For example, when the first sequence is {HE LTF 160_P1*1, HE LTF 160_P2*-1, EHT LTF 160_P1*-1, EHT LTF 160_P2*-1}, and the LTF sequence determined by the terminal device is {HE LTF 160, EHT LTF 160}, the difference sequence=[HE LTF 160_P1*1./HE LTF 160_P1, HE LTF 160_P2*-1./HE LTF 160_P2, EHT LTF 160_P1*-1./EHT LTF 160_P1, EHT LTF 160_P2*-1./EHT LTF 160_P2].

Specifically, the LTF sequence determined by the terminal device is {HE LTF 160, EHT LTF 160}, and the first sequence is {HE LTF 160_P1*1, HE LTF 160_P2*-1, EHT LTF 160_P1*-1, EHT LTF 160_P2*-1}. In this case, for the sequence {HE LTF 160} determined by the terminal device, the LTF sequence actually sent by the network device is {HE LTF 160_P1*1, HE LTF 160_P2*-1}, and the network device needs to determine a difference sequence between the two sequences. For example, if the sequence determined by the terminal device is {EHT LTF 160}, and the LTF sequence that is actually sent by the network device is {EHT LTF 160_P1*-1, EHT LTF 160_P2*-1}, the network device also needs to determine a difference sequence between the two sequences. For the sequence {EHT LTF 160} and the sequence {EHT LTF 160_P1*-1, EHT LTF 160_P2*-1}, and the sequence {HE LTF 160} and the sequence {HE LTF 160_P1*1, HE LTF 160_P2*-1}, a difference sequence between the two sequences may be considered to include two values: phase rotation parameters −1 and 1. For example, if the sequence {HE LTF 160} includes 10 numbers, the sequence {HE LTF 160_P1*1, HE LTF 160_P2*-1} also includes 10 numbers, the sequence {HE LTF 160_P1*1} includes five numbers, and the sequence {HE LTF 160_P2*-1} includes five numbers, the corresponding difference sequence is {1, 1, 1, 1, 1, −1, −1, −1, −1, −1}. If the sequence {EHT LTF 160} includes 10 numbers, the sequence {EHT LTF 160_P1*-1, EHT LTF 160_P2*-1} also includes 10 numbers, the sequence {EHT LTF 160_P1*-1} includes five numbers, and the sequence {EHT LTF 160_P2*-1} includes five numbers, the corresponding difference sequence is {−1, −1, −1, −1, −1, −1, −1, −1, −1, −1}.

Therefore, a difference sequence between the sequence {HE LTF 160, EHT LTF 160} and the first sequence {HE LTF 160_P1*1, HE LTF 160_P2*-1, EHT LTF 160_P1*-1, EHT LTF 160_P2*-1} is {1, 1, 1, 1, 1, −1, −1, −1, −1, −1, −1, −1, −1, −1, −1, −1, −1, −1, −1, −1}.

Therefore, the second data sequence and the first data sequence meet the following relationship: second data sequence=first data sequence.*Gapseq. In other words, each element in the first data sequence needs to be multiplied by each corresponding element in Gapseq in a one-to-one manner, to obtain the second data sequence.

Specifically, after determining the difference sequence, the network device multiplies corresponding elements in the first data sequence based on elements in the difference sequence, to determine the second data sequence.

It should be understood that, after the network device adjusts an LTF sequence sending manner, the network device also needs to perform corresponding processing on transmission of a data sequence. In this way, a problem that a sent sequence is inconsistent with a known sequence of the terminal device can be resolved, so that transparent transmission is implemented for the terminal device, and the terminal device does not need to make any modification or change.

It should be understood that, after adjusting an LTF sequence sending manner, the network device performs corresponding processing on transmission of a data sequence. In this way, a problem that a sent sequence is inconsistent with a known sequence of the terminal device can be resolved, so that transparent transmission is implemented for the terminal device, and the terminal device does not need to make any modification or change.

FIG. 6 is a schematic diagram of another example data transmission method according to an embodiment of this application. The method #600 is performed by a network device.

S610: Determine an A-PPDU, where the A-PPDU includes at least two PPDUs belonging to different protocols, the A-PPDU includes a first sequence, and the first sequence includes a HE LTF sequence or an EHT LTF sequence.

It should be understood that the A-PPDU includes a plurality of PPDUs that belong to different protocols. For example, the A-PPDU includes a HE PPDU and an EHT PPDU, or the A-PPDU includes a VHT PPDU and an HT PPDU, or the A-PPDU may include a HE PPDU, an EHT PPDU, a VHT PPDU, and an HT PPDU. This is not specifically limited in this embodiment of this application.

It should be understood that the first sequence included in the A-PPDU includes a HE LTF sequence or an EHT LTF sequence. It can be learned from the above that, when the A-PPDU includes a plurality of PPDUs that belong to different protocols, it means that each PPDU has a corresponding LTF sequence. However, if the LTF sequences corresponding to the plurality of PPDUs are directly combined and sent, a large PAPR is caused. Therefore, when the first sequence included in the A-PPDU includes a HE LTF sequence or an EHT LTF sequence, a total PAPR of the A-PPDU can be effectively reduced.

S620: Send the A-PPDU.

Correspondingly, a terminal device receives the A-PPDU from the network device.

Composition of an LTF sequence for downlink transmission of the A-PPDU is changed, in other words, the network device sends only a HE LTF sequence or an EHT LTF sequence, so that a total PAPR generated in downlink transmission of the A-PPDU can be effectively reduced in this application.

The following describes beneficial effects obtained by sending one LTF sequence in this embodiment of this application.

TABLE 7

| A-PPDU aggregation type 1 | | | | | | | | |
|---|---|---|---|---|---|---|---|---|
| LTF 4x sequence | 3*996 | | | 2*996 | | | | 4*996 |
| {HE LTF 160, EHT LTF 160} | 8.73 | 9.02 | 8.56 | 8.94 | 9.26 | 7.58 | 7.48 | 10.01 | 9.45 |
| {EHT LTF 320} | 7.88 | 8.26 | 7.83 | 8.25 | 8.75 | 6.44 | 6.50 | 8.77 | 8.36 |

Table 7 shows PAPR values corresponding to different LTF sequence sending manners when an LTF sequence is the LTF4x sequence. It should be understood that 3*996, 2*996, and 4*996 in a first row of Table 7 are specific configuration forms of tones of MRUs.

It should be understood that Table 7 shows comparison between PAPR values corresponding to different LTF sequence composition manners in a case of a same configuration form. For example, if the configuration form is 4*996, when the LTF sequence of the A-PPDU includes {HE LTF 160, EHT LTF 160}(the sequence may also be understood as an existing sending manner of the LTF sequence of the A-PPDU), a PAPR value corresponding to the LTF sequence is 9.45; and when the first sequence includes {EHT LTF 320}, a PAPR value corresponding to the first sequence is 8.36. It can be learned from the foregoing comparison that, compared with an existing composition manner of the LTF sequence, the LTF sequence obtained by using the phase rotation solution in this embodiment of this application can generate a small PAPR value.

It can be learned from the foregoing comparison that, compared with an existing composition manner of the LTF sequence, the LTF sequence obtained by using the solution in this embodiment of this application can generate a small PAPR value.

TABLE 8

| A-PPDU aggregation type 1 | | | | | | | | |
|---|---|---|---|---|---|---|---|---|
| LTF 2x sequence | 3*996 | | | 2*996 | | | | 4*996 |
| {HE LTF 160, EHT LTF 160} | 9.46 | 8.85 | 9.13 | 8.86 | 9.02 | 7.32 | 6.81 | 9.67 | 9.78 |
| EHT LTF 320} | 7.56 | 8.02 | 7.76 | 7.17 | 7.67 | 7.94 | 7.55 | 7.56 | 7.66 |

Table 8 shows PAPR values corresponding to different LTF sequence sending manners when an LTF sequence is the LTF2x sequence. It should be understood that 3*996, 2*996, and 4*996 in a first row of Table 8 are specific configuration forms of tones of MRUs.

It should be understood that Table 8 shows comparison between PAPR values corresponding to different LTF sequence composition manners in a case of a same configuration form. For example, if the configuration form is 4*996, when the LTF sequence of the A-PPDU includes {HE LTF 160, EHT LTF 160}(the sequence may also be understood as an existing sending manner of the LTF sequence of the A-PPDU), a PAPR value corresponding to the LTF sequence is 9.78; and when the first sequence includes {EHT LTF 320}, a PAPR value corresponding to the first sequence is 7.366. It can be learned from the foregoing comparison that, compared with an existing composition manner of the LTF sequence, the LTF sequence obtained by using the phase rotation solution in this embodiment of this application can generate a small PAPR value.

It can be learned from the foregoing comparison that, compared with an existing composition manner of the LTF sequence, the LTF sequence obtained by using the solution in this embodiment of this application can generate a small PAPR value.

TABLE 9

| A-PPDU aggregation type 2 | | | | | | | | | |
|---|---|---|---|---|---|---|---|---|---|
| LTF 4x sequence | 3*996 | | | | 2*996 | | | 4*996 | |
| {EHT LTF 160, HE LTF 160} | 8.72 | 8.94 | 8.54 | 9.02 | 9.26 | 7.43 | 7.59 | 10.01 | 9.43 |
| {EHT LTF 320} | 7.89 | 8.25 | 7.88 | 8.26 | 8.75 | 6.71 | 6.44 | 8.77 | 8.36 |

Table 9 shows PAPR values corresponding to different LTF sequence sending manners when an LTF sequence is the LTF4x sequence. It should be understood that 3*996, 2*996, and 4*996 in a first row of Table 9 are specific configuration forms of tones of MRUs.

It should be understood that Table 9 shows comparison between PAPR values corresponding to different LTF sequence composition manners in a case of a same configuration form. For example, if the configuration form is 4*996, when the LTF sequence of the A-PPDU includes {EHT LTF 160, HE LTF 160}(the sequence may also be understood as an existing sending manner of the LTF sequence of the A-PPDU), a PAPR value corresponding to the LTF sequence is 9.43; and when the first sequence includes {EHT LTF 320}, a PAPR value corresponding to the first sequence is 8.36. It can be learned from the foregoing comparison that, compared with an existing composition manner of the LTF sequence, the LTF sequence obtained by using the phase rotation solution in this embodiment of this application can generate a small PAPR value.

It can be learned from the foregoing comparison that, compared with an existing composition manner of the LTF sequence, the LTF sequence obtained by using the solution in this embodiment of this application can generate a small PAPR value.

TABLE 10

| A-PPDU aggregation type 2 | | | | | | | | | |
|---|---|---|---|---|---|---|---|---|---|
| LTF 2x sequence | 3*996 | | | | 2*996 | | | 4*996 | |
| {EHT LTF 160, HE LTF 160} | 9.13 | 8.86 | 9.46 | 8.85 | 9.02 | 7.23 | 6.98 | 9.67 | 9.78 |
| {EHT LTF 320} | 7.59 | 7.95 | 8.05 | 7.31 | 7.85 | 7.74 | 7.55 | 7.77 | 7.68 |

Table 10 shows PAPR values corresponding to different LTF sequence sending manners when an LTF sequence is the LTF2x sequence. It should be understood that 3*996, 2*996, and 4*996 in a first row of Table 10 are specific configuration forms of tones of MRUs.

It should be understood that Table 10 shows comparison between PAPR values corresponding to different LTF sequence composition manners in a case of a same configuration form. For example, if the configuration form is 4*996, when the LTF sequence of the A-PPDU includes {EHT LTF 160, HE LTF 160}(the sequence may also be understood as an existing sending manner of the LTF sequence of the A-PPDU), a PAPR value corresponding to the LTF sequence is 9.78; and when the first sequence includes {EHT LTF 320}, a PAPR value corresponding to the first sequence is 7.68. It can be learned from the foregoing comparison that, compared with an existing composition manner of the LTF sequence, the LTF sequence obtained by using the phase rotation solution in this embodiment of this application can generate a small PAPR value.

It can be learned from the foregoing comparison that, compared with an existing composition manner of the LTF sequence, the LTF sequence obtained by using the solution in this embodiment of this application can generate a small PAPR value.

It can be learned that, when composition of the first sequence for downlink transmission of the A-PPDU is changed, a total PAPR value generated in downlink transmission of the A-PPDU can be effectively reduced in this application.

TABLE 11

| A-PPDU aggregation type 3 | |
|---|---|
| LTF 4x sequence | 2*996 |
| {HE LTF 80, EHT LTF 80} | 9.26 |
| {EHT LTF 320_P1, EHT LTF 320_P2} | 6.17 |
| {HE LTF 160} | 7.14 |

Table 11 shows PAPR values corresponding to different LTF sequence sending manners when an LTF sequence is the LTF4x sequence. It should be understood that 2*996 in a first row of Table 11 is a specific configuration form of tones of MRUs.

Specifically, if the configuration manner is 2*996, when the LTF sequence of the A-PPDU includes {HE LTF 80, EHT LTF 80}(the sequence may also be understood as an existing sending manner of the LTF sequence of the A-PPDU), a PAPR value corresponding to the LTF sequence is 9.26; when the first sequence includes {EHT LTF 320_P1, EHT LTF 320_P2}, a PAPR value corresponding to the first value is 6.17; and when the first sequence includes {HE LTF 160}, a PAPR value corresponding to the first sequence is 7.14. It can be learned from the foregoing comparison that, compared with an existing composition manner of the LTF sequence, the LTF sequence obtained by using the solution in this embodiment of this application can generate a small PAPR value.

It can be learned that, when composition of the first sequence for downlink transmission of the A-PPDU is changed, a total PAPR value generated in downlink transmission of the A-PPDU can be effectively reduced in this application.

TABLE 12

| A-PPDU aggregation type 3 | |
| --- | --- |
| LTF 2x sequence | 2*996 |
| {HE LTF 80, EHT LTF 80} | 8.92 |
| {EHT LTF 320_P1, EHTLTF 320_P2} | 7.24 |
| {HE LTF 160} | 7.23 |

Table 12 shows PAPR values corresponding to different LTF sequence sending manners when an LTF sequence is the LTF2x sequence. It should be understood that 2*996 in a first row of Table 12 is a specific configuration form of tones of MRUs.

Specifically, if the configuration manner is 2*996, when the LTF sequence of the A-PPDU includes {HE LTF 80, EHT LTF 80}(the sequence may also be understood as an existing sending manner of the LTF sequence of the A-PPDU), a PAPR value corresponding to the LTF sequence is 8.92; when the first sequence includes {EHT LTF 320_P1, EHT LTF 320_P2}, a PAPR value corresponding to the first sequence is 7.24; and when the first sequence includes {HE LTF 160}, a PAPR value corresponding to the first sequence is 7.23. It can be learned from the foregoing comparison that, compared with an existing composition manner of the LTF sequence, the LTF sequence obtained by using the solution in this embodiment of this application can generate a small PAPR value.

It can be learned that, when composition of the first sequence for downlink transmission of the A-PPDU is changed, a total PAPR value generated in downlink transmission of the A-PPDU can be effectively reduced in this application.

TABLE 13

| A-PPDU aggregation type 4 | |
| --- | --- |
| LTF 4x sequence | 2*996 |
| {EHT LTF 80, HE LTF 80} | 9.26 |
| {EHT LTF 320_P1, EHT LTF 320_P2} | 6.56 |
| {HE LTF 160} | 7.38 |

Table 13 shows PAPR values corresponding to different LTF sequence sending manners when an LTF sequence is the LTF4x sequence. It should be understood that 2*996 in a first row of Table 13 is a specific configuration form of tones of MRUs.

Specifically, if the configuration manner is 2*996, when the LTF sequence of the A-PPDU includes {EHT LTF 80, HE LTF 80}(the sequence may also be understood as an existing sending manner of the LTF sequence of the A-PPDU), a PAPR value corresponding to the LTF sequence is 9.26; when the first sequence includes {EHT LTF 320_P1, EHT LTF 320_P2}, a PAPR value corresponding to the first sequence is 6.56; and when the first sequence includes {HE LTF 160}, a PAPR value corresponding to the first sequence is 7.38. It can be learned from the foregoing comparison that, compared with an existing composition manner of the LTF sequence, the LTF sequence obtained by using the solution in this embodiment of this application can generate a small PAPR value.

It can be learned that, when composition of the first sequence for downlink transmission of the A-PPDU is changed, a total PAPR value generated in downlink transmission of the A-PPDU can be effectively reduced in this application.

TABLE 14

| A-PPDU aggregation type 4 | |
| --- | --- |
| LTF 2x sequence | 2*996 |
| {EHT LTF 80, HE LTF 80} | 8.92 |
| {EHT LTF 320_P1, EHT LTF 320_P2} | 7.58 |
| {HE LTF 160} | 7.49 |

Table 14 shows PAPR values corresponding to different LTF sequence sending manners when an LTF sequence is the LTF2x sequence. It should be understood that 2*996 in a first row of Table 14 is a specific configuration form of tones of MRUs.

Specifically, if the configuration manner is 2*996, when the LTF sequence of the A-PPDU includes {EHT LTF 80, HE LTF 80}(the sequence may also be understood as an existing sending manner of the LTF sequence of the A-PPDU), a PAPR value corresponding to the LTF sequence is 8.92; when the first sequence includes {EHT LTF 320_P1, EHT LTF 320_P2}, a PAPR value corresponding to the first sequence is 7.58; and when the first sequence includes {HE LTF 160}, a PAPR value corresponding to the first sequence is 7.49. It can be learned from the foregoing comparison that, compared with an existing composition manner of the LTF sequence, the LTF sequence obtained by using the solution in this embodiment of this application can generate a small PAPR value.

It can be learned that, when composition of the first sequence for downlink transmission of the A-PPDU is changed, a total PAPR value generated in downlink transmission of the A-PPDU can be effectively reduced in this application.

It can be learned from the foregoing comparison that, composition of an LTF sequence for downlink transmission of the A-PPDU is changed, for example, only a HE LTF sequence or an EHT LTF sequence is sent, so that a PAPR value generated in downlink transmission of the A-PPDU can be effectively reduced in this application.

In a possible implementation, the A-PPDU includes a HE PPDU and an EHT PPDU. In this way, a total PAPR generated in downlink transmission of the A-PPDU including the HE PPDU and the EHT PPDU can be effectively reduced in this application.

In a possible implementation, the network device sends the A-PPDU on a 320 MHz bandwidth resource.

It should be understood that the first sequence is an EHT LTF sequence.

In a possible implementation, the network device sends the A-PPDU on a 160 MHz bandwidth resource.

It should be understood that the first sequence is an EHT LTF sequence or a HE LTF sequence.

Optionally, when the first sequence is an EHT LTF sequence, an EHT LTF sequence actually sent by the network device may be a half of an EHT LTF sequence corresponding to a 320 MHz bandwidth resource. For example, the first sequence is {EHT LTF 320_P1, EHT LTF 320_P2}, or the first sequence is {EHT LTF 320_P3, EHT LTF 320_P4}.

In a possible implementation, the method further includes the following steps.

S630: Determine a second data sequence based on a difference sequence and a first data sequence, where the difference sequence is determined based on the first sequence.

S640: Send the second data sequence.

Correspondingly, the terminal device receives the second data sequence from the network device.

It should be understood that, the first data sequence is an original data sequence, and the second data sequence is a to-be-sent data sequence.

It should be understood that, after adjusting an LTF sequence sending manner, the network device also needs to correspondingly adjust transmission of a data sequence, that is, an actually transmitted data sequence and a to-be-transmitted data sequence need to meet the following relationship: actually transmitted data sequence=to-be-transmitted data sequence.*Gapseq. The difference sequence may be understood as Gapseq. For a meaning of Gapseq, refer to the foregoing content.

It should be understood that, that the difference sequence is determined based on the first sequence may be understood as follows: After the network device determines the first sequence sent to the terminal device, an LTF sequence determined by the terminal device is different from the first sequence. For example, if the terminal device determines that the LTF sequence sent by the network device is {HE LTF 80, EHT LTF 80}, there is a difference sequence between the two sequences.

For example, the first sequence is {EHT LTF 320_P1, EHT LTF 320_P2}. When the sequence determined by the terminal device is {HE LTF 80, EHT LTF 80}, the difference sequence=[EHT LTF 320_P1./HE LTF 80, EHT LTF 320_P2./EHT LTF 80].

Specifically, the first sequence includes the HE LTF sequence or the EHT LTF sequence, and the first sequence is actually sent by the network device to the terminal device. However, the terminal device determines a second sequence. To be specific, the second sequence may be considered as a protocol-defined LTF sequence. Therefore, there is a difference sequence between the first sequence and the second sequence, and the difference sequence includes quotients obtained by dividing elements in the first sequence by corresponding elements in the second sequence.

After determining the difference sequence, the network device multiplies each element in the first data sequence by a corresponding element in the difference sequence, to determine the second data sequence. In this way, the network device can implement transparent transmission for the terminal device.

A function of the LTF sequence is to provide a reference for a data part. Therefore, after adjusting an LTF sequence sending manner, the network device also needs to perform corresponding processing on a data field. In this way, a problem that a sequence actually sent by the network device is inconsistent with a known sequence of the terminal device is resolved, and transparent transmission performed by the network device for the terminal device is implemented.

Figure 7:
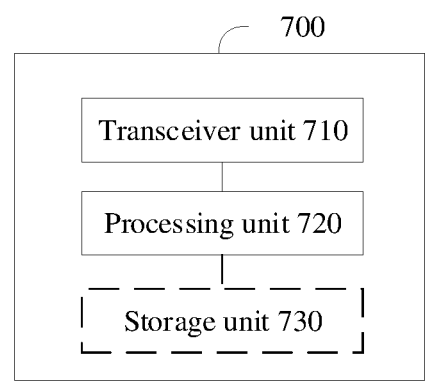
FIG. 7 is a block diagram of a structure of an example communication apparatus according to an embodiment of this application.

FIG. 7 is a schematic block diagram of an example communication apparatus 700 according to an embodiment of this application. As shown in the figure, the communication apparatus 700 may include a transceiver unit 710 and a processing unit 720.

In an example embodiment, the communication apparatus 700 may be the network device in the foregoing method embodiments, or may be a chip configured to implement a function of the network device in the foregoing method embodiments.

It should be understood that, the communication apparatus 700 may correspond to the network device in embodiments of this application, and the communication apparatus 700 may include units configured to perform the methods performed by the network device in FIG. 5 and FIG. 6. In addition, the units in the communication apparatus 700 and the foregoing other operations and/or functions are separately intended to implement corresponding procedures in FIG. 5 and FIG. 6.

In an example description, the communication apparatus 700 can implement the actions, steps, or methods related to the network device in S510, S520, S530, and S540 in the foregoing method embodiments.

It should be understood that the foregoing content is merely used an example for understanding. The communication apparatus 700 can further implement other steps, actions, or methods related to the network device in the foregoing method embodiments.

It should be understood that a specific process in which the units perform the foregoing corresponding steps is described in detail in the foregoing method embodiments.

In another example embodiment, the communication apparatus 700 may be the terminal device in the foregoing method embodiments, or may be a chip configured to implement a function of the terminal device in the foregoing method embodiments.

It should be understood that, the communication apparatus 700 may correspond to the terminal device in embodiments of this application, and the communication apparatus 700 may include units configured to perform the methods performed by the terminal device in FIG. 5 and FIG. 6. In addition, the units in the communication apparatus 700 and the foregoing other operations and/or functions are separately intended to implement corresponding procedures in FIG. 5 and FIG. 6. It should be understood that a specific process in which the units perform the foregoing corresponding steps is described in detail in the foregoing method embodiments.

Figure 8:
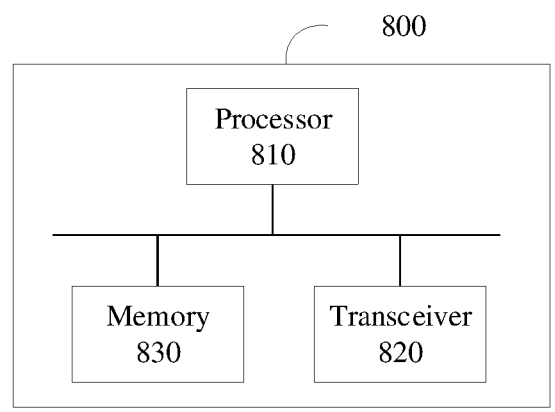
FIG. 8 is a block diagram of a structure of another example communication apparatus according to an embodiment of this application.

It should be further understood that, the transceiver unit 710 in the communication apparatus 700 may correspond to a transceiver 820 in a communication device 800 shown in FIG. 8, and the processing unit 720 in the communication apparatus 700 may correspond to a processor 810 in the communication device 800 shown in FIG. 8.

It should be further understood that, when the communication apparatus 700 is a chip, the chip includes a transceiver unit and a processing unit. The transceiver unit may be an input/output circuit or a communication interface. The processing unit may be a processor, a microprocessor, or an integrated circuit integrated on the chip.

The transceiver unit 710 is configured to implement a signal receiving and sending operation of the communication apparatus 700, and the processing unit 720 is configured to implement a signal processing operation of the communication apparatus 700.

Optionally, the communication apparatus 700 further includes a storage unit 730, and the storage unit 730 is configured to store instructions.

FIG. 8 is a schematic block diagram of an example communication device 800 according to an embodiment of this application. As shown in the figure, the communication device 800 includes at least one processor 810 and a transceiver 820. The processor 810 is coupled to a memory, and is configured to execute instructions stored in the memory, to control the transceiver 820 to send a signal and/or receive a signal. Optionally, the communication device 800 further includes a memory 830, configured to store instructions.

It should be understood that the processor 810 and the memory 830 may be integrated into one processing apparatus. The processor 810 is configured to execute program code stored in the memory 830 to implement the foregoing functions. During specific implementation, the memory 830 may alternatively be integrated into the processor 810, or may be independent of the processor 810.

It should be further understood that the transceiver 820 may include a receiver and a transmitter. The transceiver 820 may further include an antenna, and there may be one or more antennas. The transceiver 820 may be a communication interface or an interface circuit.

When the communication device 800 is a chip, the chip includes a transceiver unit and a processing unit. The transceiver unit may be an input/output circuit or a communication interface. The processing unit may be a processor, a microprocessor, or an integrated circuit integrated on the chip. An embodiment of this application further provides a processing apparatus, including a processor and an interface. The processor may be configured to perform the methods in the foregoing method embodiments.

It should be understood that the processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processing circuit (DSP), a micro controller unit (MCU), a programmable controller (PLD), or another integrated chip.

In an implementation process, the steps in the foregoing methods may be completed through a hardware integrated logical circuit in the processor or through instructions in a form of software. The steps in the methods disclosed with reference to embodiments of this application may be directly performed by a hardware processor, or may be performed through a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor.

An embodiment of this application further provides a computer-readable storage medium. The computer-readable storage medium stores computer instructions used to implement the method performed by the network device in the foregoing method embodiments.

For example, when the computer instructions is executed by a computer, the computer is enabled to implement the method performed by the network device in the foregoing method embodiments.

An embodiment of this application further provides a computer-readable storage medium. The computer-readable storage medium stores computer instructions used to implement the method performed by the terminal device in the foregoing method embodiments.

For example, when the computer instructions is executed by a computer, the computer is enabled to implement the method performed by the terminal device in the foregoing method embodiments.

An embodiment of this application further provides a computer program product including instructions. When the instructions are executed by a computer, the computer is enabled to implement the method performed by the network device or the method performed by the terminal device in the foregoing method embodiments.

It may be clearly understood by a person skilled in the art that, for the purpose of convenient and brief description, for explanations of related content and beneficial effects in any of the foregoing provided communication apparatuses, refer to corresponding method embodiments provided above.

A specific structure of an execution body of the method provided in embodiments of this application is not particularly limited in embodiments of this application, provided that communication can be performed based on the method provided in embodiments of this application by running a program that records code of the method provided in embodiments of this application. For example, the method provided in embodiments of this application may be performed by a terminal device or a network device, or may be performed by a functional module that is in a terminal device or a network device and that can invoke a program and execute the program.

Aspects or features of this application may be implemented as a method, an apparatus, or a product that uses standard programming and/or engineering technologies. The term "product" used in this specification may cover a computer program accessible from any computer-readable device, carrier, or medium.

The computer-readable storage medium may be any available medium accessible by a computer, or a data storage device, such as a server or a data center, that integrates one or more available media. The usable medium (or the computer-readable medium) may include, for example, but is not limited to, various media that can store program code, such as a magnetic medium or a magnetic storage device (for example, a floppy disk, a hard disk (for example, a removable hard disk), or a magnetic tape), an optical medium (for example, an optical disc, a compact disc (CD), or a digital versatile disc (DVD)), a smart card and a flash memory device (for example, an erasable programmable read-only memory (EPROM), a card, a stick, or a key drive), or a semiconductor medium (for example, a solid state disk (SSD), a USB flash drive, a read-only memory (ROM), or a random access memory (RAM).

The various storage media described in this specification may represent one or more devices and/or other machine-readable media for storing information. The term "machine-readable medium" may include but is not limited to a radio channel and various other media capable of storing, including, and/or carrying instructions and/or data.

It should be understood that, the memory mentioned in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) For example, the RAM may be used as an external cache. As an example rather than a limitation, the RAM may include a plurality of the following forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, when the processor is a general-purpose processor, a DSP, an ASIC, an FPGA or another programmable logic device, a discrete gate or a transistor logic device, or a discrete hardware component, the memory (storage module) may be integrated into the processor.

It should be further noted that, the memory described in this specification is intended to include, but is not limited to, these and any other suitable type of memory.

In the several embodiments provided in this application, it should be understood that the disclosed apparatus and method may be implemented in other manners. For example, the apparatus embodiments described above are merely examples. For example, division of the units is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions provided in this application.

In addition, functional units in embodiments of this application may be integrated into one unit, each of the units may exist alone physically, or two or more units may be integrated into one unit.

All or some of the foregoing embodiments may be implemented through software, hardware, firmware, or any combination thereof.

When software is used for implementation, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. For example, the computer may be a personal computer, a server, or a network device. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. For the computer-readable storage medium, refer to the foregoing description.

It should be understood that, in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that, in this application, both "when . . . " and "if" mean that a network element performs corresponding processing in an objective situation, and are not intended to limit time. The terms do not mean that the network element is required to have a determining action during implementation, and do not mean any other limitation.

It should be further understood that in embodiments of this application, "B corresponding to A" represents that B is associated with A, or B may be determined based on A. However, it should be further understood that determining B based on A does not mean that B is determined based only on A. B may alternatively be determined based on A and/or other information.

It should be further understood that the term "and/or" in this specification describes only an association relationship between associated objects and represents that three relationships may exist. For example, "A and/or B" may represent any one of the following three cases: Only A exists, both A and B exist, or only B exists. In addition, the character "/" used in this specification usually indicates that there is an "or" relationship between associated objects.

The foregoing descriptions are merely non-limiting examples of specific implementations and are not intended to limit the protection scope, which is intended to cover any variation or replacement readily determined by a person of ordinary skill in the art. Therefore, the claims shall define the protection scope.

What is claimed is:

1. A data transmission method, comprising:
determining an aggregated physical layer protocol data unit (A-PPDU), wherein the A-PPDU comprises at least two physical layer protocol data units (PPDUs) belonging to different protocols, the A-PPDU comprises a first sequence including N segments of subsequences, any of the N segments of subsequences is obtained by performing phase rotation on a high efficiency-long training field (HE LTF) sequence and/or an extreme high throughput-long training field (EHT LTF) sequence based on a phase rotation parameter corresponding to the HE LTF sequence and/or a phase rotation parameter corresponding to the EHT LTF sequence, N phase rotation parameters corresponding to the N segments of subsequences comprise at least one phase rotation parameter whose value is −1, and N is an integer greater than or equal to 2; and
sending the A-PPDU.

2. The method according to claim 1, wherein the A-PPDU comprises a HE PPDU and an EHT PPDU.

3. The method according to claim 1, wherein the sending the A-PPDU comprises:
sending the A-PPDU on a 320 MHz bandwidth resource.

4. The method according to claim 1, wherein N=4, and the N phase rotation parameters comprises:
{1, −1, −1, −1}, {1, −1, 1, 1}, {1, 1, −1, 1}, and {1, 1, 1, −1};
{−1, 1, 1, 1}, {−1, 1, −1, −1}, {−1, −1, 1, −1}, and {−1, −1, −1, 1};
{1, −1, −1, 1}, {1, −1, 1, −1}, {−1, 1, 1, −1}, and {−1, 1, −1, 1}; and/or
{1, 1, −1, −1} and {−1, −1, 1, 1}.

5. The method according to claim 1, further comprising:
determining a second data sequence based on a difference sequence and a first data sequence; and
sending the second data sequence, wherein
the first data sequence is an original data sequence, the second data sequence is a to-be-sent data sequence, and the difference sequence is determined based on the first sequence.

6. A data transmission method, comprising:
receiving an aggregated physical layer protocol data unit (A-PPDU), wherein the A-PPDU comprises at least two PPDUs belonging to different protocols, the A-PPDU comprises a first sequence, the first sequence comprises N segments of subsequences, any of the N segments of subsequences is obtained by performing phase rotation on a high efficiency-long training field (HE LTF) sequence and/or an extreme high throughput-long training field (EHT LTF) sequence based on a phase rotation parameter corresponding to the HE LTF sequence and/or a phase rotation parameter corresponding to the EHT LTF sequence, N phase rotation parameters corresponding to the N segments of subsequences comprise at least one phase rotation parameter whose value is −1, and N is a positive integer greater than or equal to 2.

7. The method according to claim 6, wherein the A-PPDU comprises a HE PPDU and an EHT PPDU.

8. The method according to claim 6, wherein the receiving an A-PPDU comprises:
receiving the A-PPDU on a 320 MHz bandwidth resource.

9. The method according to claim 6, wherein N=4, and the N phase rotation parameters comprise:
{1, −1, −1, −1}, {1, −1, 1, 1}, {1, 1, −1, 1}, and {1, 1, 1, −1};
{−1, 1, 1, 1}, {−1, 1, −1, −1}, {−1, −1, 1, −1}, and {−1, −1, −1, 1};
{1, −1, −1, 1}, {1, −1, 1, −1}, {−1, 1, 1, −1}, and {−1, 1, −1, 1}; and/or
{1, 1, −1, −1} and {−1, −1, 1, 1}.

10. The method according to claim 6, further comprising:
receiving a second data sequence, wherein the second data sequence is determined based on a difference sequence and a first data sequence, wherein
the first data sequence is an original data sequence, the second data sequence is a to-be-sent data sequence, and the difference sequence is determined based on the first sequence.

11. A communication apparatus, comprising:
a non-transitory memory storage comprising instructions that, when executed by
one or more processors in communication with the memory, cause the communication apparatus to:
determine an aggregated physical layer protocol data unit (A-PPDU), wherein the A-PPDU comprises at least two physical layer protocol data units (PPDUs) belonging to different protocols, the A-PPDU comprises a first sequence including N segments of subsequences, any of the N segments of subsequences is obtained by performing phase rotation on a high efficiency-long training field (HE LTF) sequence and/or an extreme high throughput-long training field (EHT LTF) sequence based on a phase rotation parameter corresponding to the HE LTF sequence and/or a phase rotation parameter corresponding to the EHT LTF sequence, N phase rotation parameters corresponding to the N segments of subsequences comprise at least one phase rotation parameter whose value is −1, and N is a positive integer greater than or equal to 2; and
send the A-PPDU.

12. The communication apparatus according to claim 11, wherein the A-PPDU comprises a HE PPDU and an EHT PPDU.

13. The communication apparatus according to claim 11, wherein, when the instructions are executed by the one or more processors, the communication apparatus is further caused to:
send the A-PPDU on a 320 MHz bandwidth resource.

14. The communication apparatus according to claim 11, wherein N=4, and the N phase rotation parameters comprise:
{1, −1, −1, −1}, {1, −1, 1, 1}, {1, 1, −1, 1}, and {1, 1, 1, −1};
{−1, 1, 1, 1}, {−1, 1, −1, −1}, {−1, −1, 1, −1}, and {−1, −1, −1, 1};
{1, −1, −1, 1}, {1, −1, 1, −1}, {−1, 1, 1, −1}, and {−1, 1, −1, 1}; and/or
{1, 1, −1, −1} and {−1, −1, 1, 1}.

15. The communication apparatus according to claim 11, wherein, when the instructions are executed by the one or more processors, the communication apparatus is further caused to:
determine a second data sequence based on a difference sequence and a first data sequence; and
send the second data sequence, wherein
the first data sequence is an original data sequence, the second data sequence is a to-be-sent data sequence, and the difference sequence is determined based on the first sequence.

16. A communication apparatus, comprising:
a non-transitory memory storage comprising instructions that, when executed by
one or more processors in communication with the memory, cause the communication apparatus to:
receive an aggregated physical layer protocol data unit (A-PPDU), wherein the A-PPDU comprises at least two physical layer protocol data units (PPDUs) belonging to different protocols, the A-PPDU comprises a first sequence including N segments of subsequences, any of the N segments of subsequences is obtained by performing phase rotation on a high efficiency-long training field (HE LTF) sequence and/or an extreme high throughput-long training field (EHT LTF) sequence based on a phase rotation parameter corresponding to the HE LTF sequence and/or a phase rotation parameter corresponding to the EHT LTF sequence, N phase rotation parameters corresponding to the N segments of subsequences comprise at least one phase rotation parameter whose value is −1, and N is a positive integer greater than or equal to 2.

17. The communication apparatus according to claim 16, wherein the A-PPDU comprises a HE PPDU and an EHT PPDU.

18. The communication apparatus according to claim 16, wherein, when the instructions are executed by the one or more processors, the communication apparatus is further caused to:
receive the A-PPDU on a 320 MHz bandwidth resource.

19. The communication apparatus according to claim 16, wherein N=4, and the N phase rotation parameters comprise:
{1, −1, −1, −1}, {1, −1, 1, 1}, {1, 1, −1, 1}, and {1, 1, 1, −1};
{−1, 1, 1, 1}, {−1, 1, −1, −1}, {−1, −1, 1, −1}, and {−1, −1, −1, 1};
{1, −1, −1, 1}, {1, −1, 1, −1}, {−1, 1, 1, −1}, and {−1, 1, −1, 1}; and/or
{1, 1, −1, −1} and {−1, −1, 1, 1}.

20. The communication apparatus according to claim 16, wherein, when the instructions are executed by the one or more processors, the communication apparatus is further caused to receive a second data sequence, wherein the second data sequence is determined based on a difference sequence and a first data sequence, wherein
  the first data sequence is an original data sequence, the second data sequence is a to-be-sent data sequence, and the difference sequence is determined based on the first sequence.

* * * * *

UNITED STATES PATENT AND TRADEMARK OFFICE
CERTIFICATE OF CORRECTION

Page 1 of 1

PATENT NO.          : 12,445,242 B2
APPLICATION NO.     : 18/613252
DATED               : October 14, 2025
INVENTOR(S)         : Bo Gong et al.

It is certified that error appears in the above-identified patent and that said Letters Patent is hereby corrected as shown below:

In the Specification

Column 15, Lines 50, 54, 55, change "802.1" to --802.11--;

Column 21, Line 41, change "{, –1, 1, 1}" to --{1, –1, 1, 1}--;

Column 21, Line 44, change "–1, –1, 1}" to -- –1, –1, 1};--;

Column 26, Line 6, change "{1, 1, 1, 1" to --{1, 1, 1, 1}--;

Column 28, Line 48, change "160_1P2" to --160_P2--; and

Column 28, Line 50, change "320_P32*b" to --320_P2*b--.

Signed and Sealed this
Eighteenth Day of November, 2025

John A. Squires
*Director of the United States Patent and Trademark Office*